US00RE50923E

(19) United States
(12) Reissued Patent
Suman et al.

(10) Patent Number: US RE50,923 E
(45) Date of Reissued Patent: Jun. 16, 2026

(54) METHODS AND APPARATUS FOR CAPTURING MEDIA USING PLURALITY OF CAMERAS IN ELECTRONIC DEVICE

(71) Applicant: SAMSUNG ELECTRONICS CO., LTD., Suwon-si (KR)

(72) Inventors: Digadari Suman, Bangalore (IN); Abhijit Dey, Bangalore (IN); Apurbaa Bhattacharjee, Bangalore (IN); Gaurav Khandelwal, Bangalore (IN); Kiran Nataraju, Bangalore (IN)

(73) Assignee: SAMSUNG ELECTRONICS CO., LTD., Suwon-si (KR)

(21) Appl. No.: 18/199,123

(22) Filed: May 18, 2023

Related U.S. Patent Documents

Reissue of:
(64) Patent No.: 11,012,603
Issued: May 18, 2021
Appl. No.: 16/436,060
Filed: Jun. 10, 2019

(30) Foreign Application Priority Data

Jun. 8, 2018 (IN) ..... 201841021587
Mar. 22, 2019 (IN) ..... 201841021587
Jun. 7, 2019 (KR) ..... 10-2019-0067586

(51) Int. Cl.
*H04N 5/225* (2006.01)
*G02B 7/09* (2021.01)
(Continued)

(52) U.S. Cl.
CPC ..... *H04N 23/45* (2023.01); *G02B 7/09* (2013.01); *H04N 23/10* (2023.01);
(Continued)

(58) Field of Classification Search
None
See application file for complete search history.

(56) References Cited

U.S. PATENT DOCUMENTS 9,716,825 B1 * 7/2017 Manzari ..... G06F 3/04883
9,912,853 B2 3/2018 Zou ..... H04N 23/62
(Continued)

FOREIGN PATENT DOCUMENTS

CN 107959778 4/2018
EP 3 267 670 A1 10/2018
(Continued)

OTHER PUBLICATIONS

Samsung Galaxy A8 Star—Spec and Features, Samsung India, Copyright 1995-2019 Samsung, http://www.samsung.com/in/microsite/galaxy-a8-star/, p. 6.
(Continued)

*Primary Examiner* — Yuzhen Ge
(74) *Attorney, Agent, or Firm* — Sughrue Mion, PLLC

(57) ABSTRACT

An apparatus for capturing media for capturing media using a plurality of cameras associated with an electronic device based on an ambient light condition is provided. The apparatus includes a processor, and a memory unit coupled to the processor, the memory unit including a processing module configured to obtain at least one preview frame from a first camera in response to enabling an image capture application of the electronic device, determine ambient light parameters of the obtained at least one preview frame, and switch a camera operation of the electronic device from the first camera to a second camera to capture the media, if the determined ambient light parameters are below a pre-defined threshold.

20 Claims, 22 Drawing Sheets

(51) Int. Cl.

| | |
|---|---|
| ***H04N 5/232*** | (2006.01) |
| ***H04N 23/10*** | (2023.01) |
| ***H04N 23/45*** | (2023.01) |
| ***H04N 23/667*** | (2023.01) |
| ***H04N 23/67*** | (2023.01) |
| ***H04N 23/73*** | (2023.01) |

(52) U.S. Cl.

CPC ..... *H04N 23/667* (2023.01); *H04N 23/67* (2023.01); *H04N 23/73* (2023.01)

(56) References Cited

U.S. PATENT DOCUMENTS

| | | | | |
|---|---|---|---|---|
| 10,616,459 | B2 * | 4/2020 | Ouyang | H04N 23/53 |
| 10,742,860 | B2 * | 8/2020 | Ouyang | H04N 23/951 |
| 10,878,539 | B2 * | 12/2020 | Ouyang | G06T 7/194 |
| 2011/0076003 | A1 * | 3/2011 | Cho | H04M 1/72403 396/297 |
| 2014/0012112 | A1 * | 1/2014 | Kaku | A61B 1/045 600/328 |
| 2014/0285672 | A1 * | 9/2014 | Hogasten | H04N 23/23 348/164 |
| 2015/0077580 | A1 | 3/2015 | Kim et al. | |
| 2015/0116544 | A1 | 4/2015 | Xu et al. | H04N 23/667 348/234 |
| 2016/0205301 | A1 | 7/2016 | Park | |
| 2016/0286108 | A1 | 9/2016 | Fettig et al. | |
| 2016/0330369 | A1 | 11/2016 | Corcoran et al. | |
| 2017/0070666 | A1 | 3/2017 | Kim | |
| 2017/0118450 | A1 | 4/2017 | Jung et al. | H04N 23/843 |
| 2018/0013955 | A1 | 1/2018 | Kim et al. | |
| 2019/0164256 | A1 * | 5/2019 | Ouyang | H04N 13/25 |
| 2019/0166286 | A1 * | 5/2019 | Ouyang | H04N 23/951 |
| 2019/0166288 | A1 * | 5/2019 | Ouyang | H04N 23/45 |
| 2019/0222738 | A1 * | 7/2019 | Galor Gluskin | H04N 5/2355 |
| 2019/0241123 | A1 * | 8/2019 | Yan | H04N 7/181 |

FOREIGN PATENT DOCUMENTS

| | | | |
|---|---|---|---|
| KR | 101169017 | | 7/2012 |
| KR | 10-2016-0087324 | A | 7/2016 |
| KR | 10-2017-0030347 | A | 3/2017 |
| KR | 10-2017-0046498 | A | 5/2017 |
| KR | 10-2018-0005543 | A | 1/2018 |
| WO | 2007/042113 | A1 | 4/2007 |

OTHER PUBLICATIONS

Extended European Search Report dated Feb. 17, 2023, issued in counterpart European Patent Application No. 22211064.5.

Communication issued on Jul. 7, 2025 by the European Patent Office in European Patent Application No. 25169943.5.

Communication issued on Aug. 1, 2025 by the Korean Intellectual Property Office in Korean Patent Application No. 10-2024-0124883.

Office Action issued on Oct. 20, 2023 by the Korean Patent Office in corresponding KR Patent Application No. 10-2019-0067586.

Communication issued on Sep. 23, 2024 by the Korean Intellectual Property Office for Korean Patent Application No. 10-2024-0124883.

Communication issued on Jun. 14, 2024 by the Korean Intellectual Property Office for Korean Patent Application No. 10-2019-0067586.

International Search Report dated Sep. 16, 2019 issued in counterpart application No. PCT/KR2019/006955, 10 pages.

European Search Report dated Mar. 12, 2021 issued in counterpart application No. 19815603.6-1208, 6 pages.

Indian Examination Report dated Dec. 30, 2020 issued in counterpart application No. 201841021587, 5 pages.

* cited by examiner

METHODS AND APPARATUS FOR CAPTURING MEDIA USING PLURALITY OF CAMERAS IN ELECTRONIC DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a reissue application of U.S. Pat. No. 11,012,603, which was filed as U.S. patent application Ser. No. 16/436,060 on Jun. 10, 2019, and issued on May 18, 2021, and which claims priority from Indian Patent Application No. 201841021587, filed on Jun. 8, 2018, in the Intellectual Property India, Korean Patent Application No. 10-2019-0067586, filed on Jun. 7, 2019, in the Korean Intellectual Property Office, and Indian Patent Application No. 201841021587 CS, filed on Mar. 22, 2019, in the Intellectual Property India, the disclosures of which are incorporated herein by reference in their entirety.*

CROSS REFERENCE TO RELATED APPLICATION

This application is based on and claims priority under 35 U.S.C. § 119(a) to Indian Provisional Application Serial No. 201841021587, filed on Jun. 8, 2018 and Indian Complete Application Serial No. 201841021587, filed on Mar. 22, 2019, filed in the Indian Intellectual Property Office, and Korean Patent Application No. 10-2019-0067586, filed on Jun. 7, 2019, in the Korean Intellectual Property Office, the entire disclosures of which are incorporated herein by reference herein in their entirety.

BACKGROUND

1. Field

The present disclosure relates generally to the field of a multiple camera systems having two or more image sensors and more particularly to methods and apparatus for capturing media using a plurality of cameras associated with an electronic device, based on ambient light condition.

2. Description of Related Art

Currently, a multiple camera system may have multiple image sensors which are mounted in one electronic device. The electronic device may utilize the multiple image sensors to capture light from a scene and produce digital information representing media of the scene.

FIG. 1A illustrates an example of a conventional dual camera electronic device capturing a low light image. The dual camera combinations in the electronic device may have less performance during low light photography. Further, as two image sensors need to be switched ON, the power consumption of the electronic device may be more. Also, combining frames for each image may impact shot-to-shot time performance and the preview image quality cannot be improved in low light environment with a conventional dual camera as the images may not be combined during the preview of the scene.

FIG. 1B illustrates an example conventional solution for optimal low light image. Accordingly, dark frames of a scene with more noise from an image sensor may be fed to a Low Light Solution (LLS) block, which in turn take approximately 500 milliseconds to process 5 frames. The LLS block can be a library that may be used for low light photography. The LLS block may obtain multiple frames as input(s) and perform post processing. The LLS block may further apply frame fusion to generate better quality output frame.

However, in conventional methods, the image sensor may be switched based on receiving signal from an additional hardware module.

SUMMARY

The present disclosure has been made to address at least the disadvantages described above and to provide at least the advantages described below.

In accordance with an aspect of the present disclosure, an apparatus for capturing media for capturing media using a plurality of cameras associated with an electronic device based on an ambient light condition is provided. The apparatus includes a processor, and a memory unit coupled to the processor, the memory unit including a processing module configured to obtain at least one preview frame from a first camera in response to enabling an image capture application of the electronic device, determine ambient light parameters of the obtained at least one preview frame, and switch a camera operation of the electronic device from the first camera to a second camera to capture the media, if the determined ambient light parameters are below a pre-defined threshold.

In accordance with an aspect of the present disclosure, an apparatus for capturing media using a plurality of cameras associated with an electronic device based on an ambient light condition is provided. The apparatus includes a processor, and a memory unit coupled to the processor, the memory unit including a processing module configured to obtain at least one preview frame from a first camera in response to enabling an image capture application of the electronic device, determine the ambient light condition of the obtained at least one preview frame by analyzing a lux value in the obtained at least one preview frame, switch a camera operation of the electronic device from the first camera to a second camera when the determined ambient light condition is below a pre-defined threshold, obtain preview frame from the second camera in response to switching the camera operation, switch the camera operation from the second camera to the first camera when the determined ambient light condition is above the pre-defined threshold, and capture the media using at least one of the first camera and the second camera based on the determined lux value.

In accordance with an aspect of the present disclosure, a method for capturing media using a plurality of cameras associated with an electronic device based on an ambient light condition is provided. The method includes obtaining, by the electronic device, at least one preview frame from a first camera in response to enabling an image capture application of the electronic device, determining, by the electronic device, ambient light parameters of the obtained at least one preview frame, and switching, by the electronic device, a camera operation of the electronic device from the first camera to a second camera, if the determined ambient light parameters are below a pre-defined threshold.

In accordance with an aspect of the present disclosure, a method for capturing media using a plurality of camera associated with an electronic device, based on an ambient light condition is provided. The method includes obtaining, by the electronic device, at least one preview frame from a first camera in response to enabling an image capture application of the electronic device, determining, by the electronic device, the ambient light condition of the obtained at least one preview frame, by analyzing a lux value in the obtained at least one preview frame, switching, by the electronic device, a camera operation of the electronic device from the first camera to a second camera, when the determined ambient light condition is below a pre-defined threshold, obtaining, by the electronic device, a preview frame from the second camera in response to switching the camera operation, switching, by the electronic device, the camera operation from the second camera to the first camera, when the determined ambient light condition is above the pre-defined threshold and capturing, by the electronic device, a media using at least one of the first camera and the second camera based on the determined lux value.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1A:
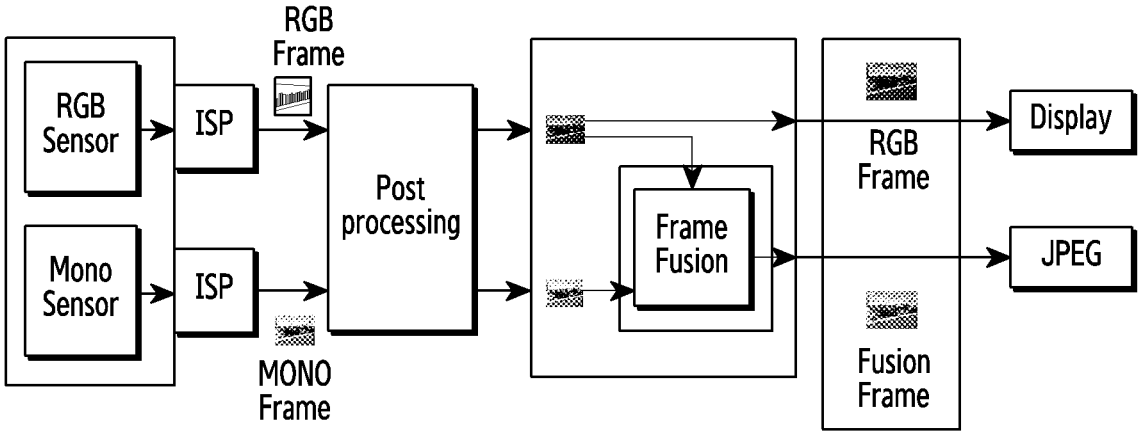
FIG.1A (PRIOR ART)
FIG. 1A is a diagram of a conventional dual camera electronic device capturing a low light image.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

Hereinafter, terms necessary to describe various embodiments of the present disclosure are defined.

A light condition means a state according to the amount of light to be detected (for example, lux). For example, the light condition may be one of a bright light condition, a normal light state, or a dark light condition. An ambient light condition may refer to a light condition based on the lux value detected by the camera around the electronic device.

A normal light scene means a scene acquired by a camera in a normal light state, and a dark light scene means a scene acquired by a camera in a dark light state. A dark light scene can be referred to as a low light image or a low light scene.

Pixel binning is a technique for achieving high sensitivity to low illumination environments by combining pixels. Pixel binning can reduce noise components.

Camera operation switching means switching between at least two cameras for image acquisition (imaging). Here, the at least two cameras may include a first camera and a second camera. The first camera may comprise a first image sensor and the second camera may comprise a second image sensor. According to one embodiment, upon image acquisition, the first image sensor is configured to output data for pixels and the second image sensor is configured to output binning data by combining pixels based on the pixel binning. That is, the first image sensor does not perform pixel binning and the second image sensor can perform pixel binning. According to one embodiment, the first image sensor provides low sensitivity and the second image sensor can provide high sensitivity. Hereinafter, a Bayer sensor is described as a first image sensor and a quadra sensor is described as a second image sensor. However, as described above, image sensors whose sensitivity can be distinguished in a low-illuminance environment are respectively referred to as a first image sensor and a second image sensor.

Figure 2:
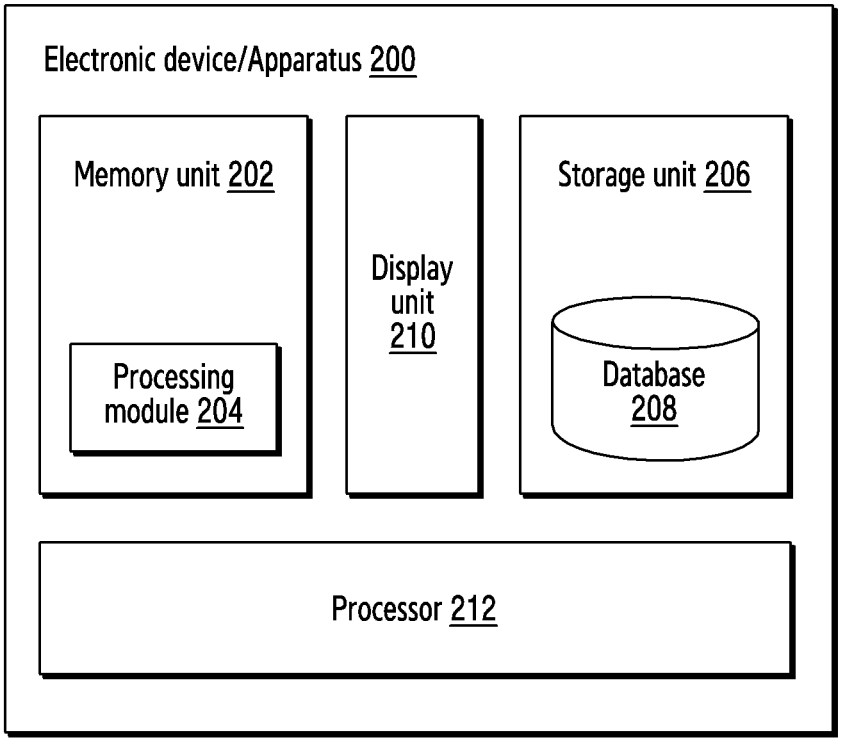
FIG. 2 is a diagram of an apparatus for capturing media using a plurality of cameras associated with an electronic device, based on ambient light condition, according to an embodiment.

FIG. 2 is a diagram of apparatus 200 for capturing media using a plurality of cameras associated with an electronic device 200, based on an ambient light condition, according to an embodiment.

The apparatus 200 includes a memory unit 202, a storage unit 206, a display unit 210, and a processor 212. Further, the apparatus 200 may include a processing module 204 residing in the memory unit 202. When the machine readable instructions are executed, the processing module 204 causes the apparatus 200 to process the data in a computing environment. Further, the apparatus 200 can also be referred herein to as an electronic device 200. Examples of the apparatus 200/electronic device 200 can be, but not limited to, a mobile phone, a smart phone, a tablet, a handheld device, a phablet, a laptop, a computer, a wearable computing device, a server, an Internet of Things (IoT) device, a vehicle infotainment system, a camera, a web camera, a digital single-lens reflex (DSLR) camera, a video camera, a digital camera, a mirror-less camera, a still camera, and so on. The apparatus 200 may include other components such as input/output interface(s), communication interface(s) and so on. The apparatus 200 may include a user application interface and an application management framework (not shown) and an application framework for capturing media using at least two cameras associated with an electronic device 200, based on an ambient light condition. The application framework can be a software library that provides a fundamental structure to support the development of applications for a specific environment. The application framework may also be used in developing graphical user interface (GUI) and web-based applications. Further, the application management framework may be responsible for the management and maintenance of the application and definition of the data structures used in databases and data files.

The apparatus 200 can operate as a standalone device or as a connected (e.g., networked) device that connects to other computer systems/devices. In a networked deployment, the apparatus 200 may operate as the server or client in a server-client network environment, or as a peer device in a peer-to-peer (or distributed) network environment. Further, the methods and apparatus described herein may be implemented on different computing devices that host a plurality of cameras. These include mobile phones, tablets, dedicated cameras, wearable computers, personal computers, photo booths or kiosks, personal digital assistants, ultra-mobile personal computers, and mobile internet devices. The apparatus 200 may include at least one of two camera lens, three camera lenses, four camera lenses, and so on.

The apparatus 200 may detect a scene and capture a plurality of frames. The optical media comprising the captured plurality of frame is converted into an electric signal. The structure of the apparatus 200 may include an optical system (e.g., lens or image sensor), a photoelectric conversion system (e.g., charged couple device (CCD), camera tube sensors, and so on) and a circuitry (such as a video processing circuit). The image sensor may output a lux value, which is a unit of illumination reflected light intensity. The color difference signals (U, V) may include two colors such as hue and saturation, and represented by Cr and Cb, where Cr reflects the difference between the red parts of the RGB signal values of RGB input luminance signal, and Cb signal reflects the blue part of the RGB input with the RGB values of the luminance difference signal. A dual camera may include two different image sensors such as at least one of, but not limited to, a CCD sensor, an active pixel sensor, a complementary metal-oxide-semiconductor (CMOS) sensor, a N-type metal-oxide-semiconductor (NMOS, Live MOS) sensor, a Bayer filter sensor, a quadra sensor, a tetra sensor, a Foveon sensor, a 3CCD sensor, a RGB (red green blue) sensor, and so on.

A device, such as a camera phone, may have two image sensors at fixed locations (i.e., the two sensors cannot be moved). The two image sensors may be configured or treated differently, such as a primary image sensor and a secondary image sensor with different resolutions. Further, the device may include two image sensors, where at least one sensor from the two image sensors may be movable. The image sensor may capture still image snapshots and/or video sequences. Also, each image sensor may include color filter arrays (CFAs) arranged on a surface of individual sensors or sensor elements. The image sensors may be arranged in line, a triangle, a circle or another pattern. The apparatus 200 may activate certain sensors and deactivate other sensors without moving any sensor. The camera residing in the apparatus 200 may include functions such as automatic focus (autofocus or AF), automatic white balance (AWB), and automatic exposure control (AEC) to produce pictures or video that are in focus, spectrally balanced, and exposed properly. AWB, AEC and AF are sometimes referred to herein as 3A convergence. An optimal exposure period may be estimated using a light meter, and/or capturing one or more images by the image sensor.

The apparatus 200 may be configured to obtain at least one of a first sensor data and a second sensor data, from a first image sensor and a second image sensor, of the electronic device 200, respectively. The first sensor data and the sensor data include a lux (lumens per square meter) value determined for 'T' milliseconds. The apparatus 200 may be configured to determine if the obtained lux value is at least one of greater than a first threshold value and a second threshold value and lesser than the first threshold value and the second threshold value. For example, the apparatus 200 is configured to determine whether the determined lux is lesser than the first threshold value or determine whether the determined lux is greater than the second threshold value. In one example, the first threshold value is lesser than or equal to the second threshold value. The apparatus 200 may be configured to switch from a first camera to a second camera, if the determined lux value is less than the first threshold value. The apparatus 200 may be configured to switch from the second camera to the first camera, if the determined lux value is greater than the second threshold value. The apparatus 200 may be configured to stabilize for a 'N' frames, the switched at least one of the first camera and the second camera, by waiting for a 3A convergence time, where the 3A convergence time comprises a duration for adjusting at least one of an AF, an AWB, and an AEC. The apparatus 200 may be configured to control between first camera and the second camera based on the lux value, where the lux value comprises ambient light condition.

The apparatus 200 may be configured to obtain at least one preview frame(s) from the first camera in response to enabling an image capture application of the electronic device. The apparatus 200 may be configured to determine an ambient light condition by analyzing the lux value, using the preview frame. The apparatus 200 may be configured to switch camera operation of the electronic device from the first camera to the second camera, when the determined ambient light condition is below a pre-defined threshold. The apparatus 200 may be configured to obtain preview frame(s) from the second camera in response to switching the camera operation. The apparatus 200 may be configured to switch camera operation from the second camera to the first camera, when the determined ambient light condition is above the pre-defined threshold. The apparatus 200 may be configured to perform pixel binning of an image received from the second camera, by combining similar adjacent pixels into a single pixel associated with the received image. The apparatus 200 may be configured to process the image signal of the pixel binned image, for performing an image correction. The apparatus 200 may be configured to up-scale the processed image with higher number of pixels.

The apparatus 200 may be configured to receive at least one of the first sensor data and the second sensor data, associated with the first image sensor and the second image sensor, respectively. The apparatus 200 may be configured to encoding YUV (luminance (Y), first color difference (U), and second color difference (V)) component of the received at least one of the first sensor data and the second sensor data. The apparatus 200 may be configured to transmit the encoded at least one of the first sensor data and the second sensor data to at least one of a capture buffer and a preview buffer. The apparatus 200 may be configured to display on the display interface of the electronic device as at least one of a captured image and a preview image, in response to the transmitted first sensor data and the second sensor data.

The apparatus 200 may be configured to cause at least one of the first image sensor and the second image sensor to enter into low power mode, when determining the switch between the first camera and the second camera. The apparatus 200 may be configured to determine the lux value based on the obtained plurality of the preview frames from at least one of the first camera and the second camera, after causing at least one of the first camera and the second camera to enter into low power mode. The apparatus 200 may be configured to switch between first camera and the second camera, if it determines the lux value is at least one of greater and lesser than at least one of the first threshold value and the second threshold value, respectively. For example, the apparatus 200 is configured to determine whether the determined lux is lesser than the first threshold value or determine whether the determined lux is greater than the second threshold value. In one example, the first threshold value is lesser than or equal to the second threshold value. The apparatus 200 may be configured to perform at least one of stop generating frame from sensor and discard frames by image signal processor (ISP) received from at least one of the first camera and the second camera.

The apparatus 200 may be configured to identify at least one of a face and a scene in the image, by at least one of the first camera and the second camera. The apparatus 200 may be configured to determine the lux value of the identified face and scene based on the received plurality of lux values from at least one of the first image sensor and the second image sensor. The identified face may include the coordinates of the face region on the image frame. The lux values within co-ordinates of the face region may be calculated. The apparatus 200 may be configured to switch from at least one of the first camera to the second camera and from the second camera to the first camera, if the determined lux value of the detected face and scene is at least one of greater and lesser than the at least one of the first threshold value and the second threshold value. For example, the apparatus 200 is configured to determine whether the determined lux is lesser than the first threshold value or determine whether the determined lux is greater than the second threshold value. In one example, the first threshold value is lesser than or equal to the second threshold value.

The first image sensor and the second image sensor may include at least one of a Bayer image sensor, a tetra sensor and a quadra image sensor. Obtaining at least one of the first sensor data and the second sensor data may include capturing plurality of the preview frames. Determining the obtained lux value may include analyzing complete lux values and average lux values received from the at least one of the first image sensor and the second image sensor. Stabilizing for the 'N' frames may include a predefined value of at least one of the first image sensor and the second image sensor parameters to stabilize the image. Encoding the YUV component may include extracting brightness information separately from color information.

FIG. 2 illustrates functional components of the computer implemented system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiments herein are explained using a device comprising two cameras, as an example. However, it may be obvious to a person of ordinary skill in the art that the embodiments herein may be implemented on devices comprising any number of cameras, wherein specific cameras can work within specific ranges of ambient light.

Figure 3:
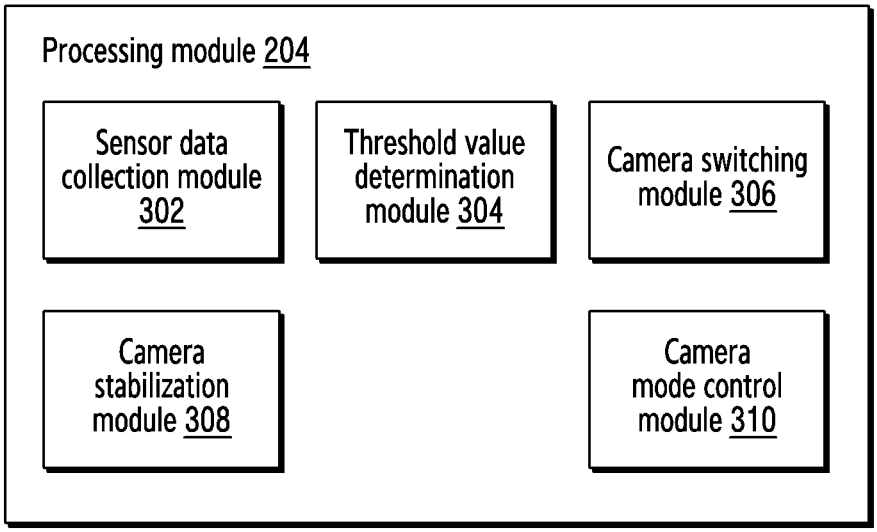
FIG. 3 is a diagram of a processing module, according to an embodiment.

FIG. 3 is a diagram of a processing module, according to an embodiment.

The apparatus 200 may include a processing module 204 stored in the memory unit 202 (as shown in FIG. 2). The processing module 204 may include a plurality of sub modules. The plurality of sub modules can include a sensor data collection module 302, a threshold value determination module 304, a camera switching module 306, a camera stabilization module 308, and a camera mode control module 310.

The sensor data collection module 302 may be configured to obtain at least one of a first sensor data and a second sensor data, from a first image sensor and a second image sensor, of the electronic device 200. The first sensor data and the sensor data may include a lux (lumens per square meter) value determined for 'T' milliseconds. The threshold value determination module 304 may be configured to determine if the obtained lux value is at least one of greater than the first threshold value and the second threshold value and lesser than the first threshold value and the second threshold value. In other words, the threshold value determination module 304 may be configured to determine whether the determined lux value is lesser than the first threshold value. Also, the threshold value determination module 304 may be configured to determine whether the determined lux value is greater than the second threshold value. In one example, the first threshold value is lesser than or equal to the second threshold value. The camera switching module 306 may be configured to switch from the first camera to the second camera corresponding to the at least two cameras, if the determined lux value is less than the first threshold value. The camera switching module 306 may be configured to switch from the second camera to the first camera corresponding to the at least two cameras, if the determined lux value is greater than the second threshold value. The camera stabilization module 308 may be configured to stabilize for 'N' frames, the switched at least one of the first camera and the second camera, by waiting for a 3A convergence time, where the 3A convergence time comprises a duration for adjusting at least one of AF, an AWB, and an AEC. The camera mode control module 310 may be configured to capture media using the first camera and the second camera based on the determined lux value. The lux value includes an ambient light condition.

Figure 4:
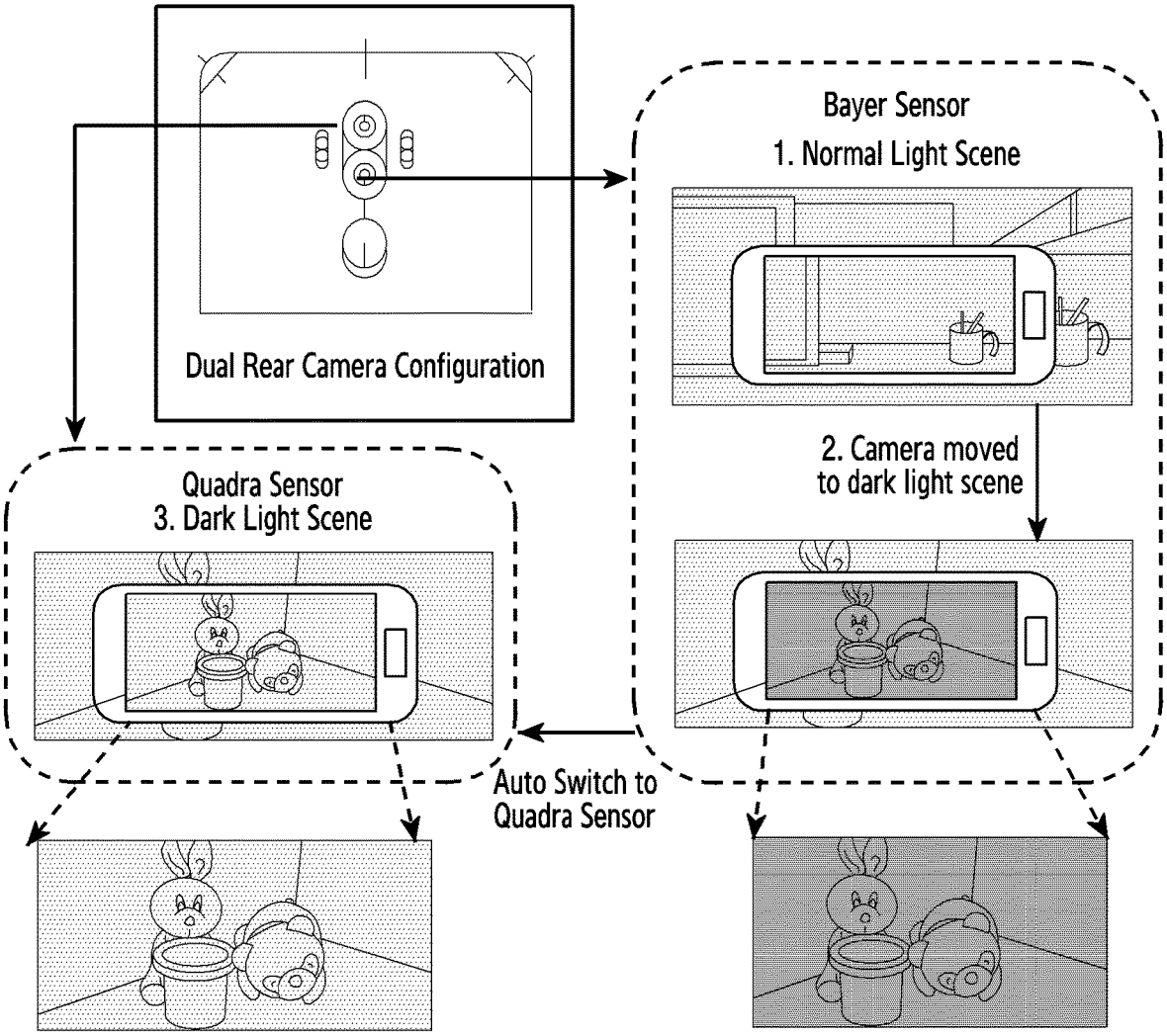
FIG. 4 is a diagram of an example scenario where an electronic device moves from normal light scene to dark light scene, according to an embodiment.

FIG. 4 is a diagram of an example scenario, where an electronic device moves from normal light scene to dark light scene, according to an embodiment. As described above, the normal light scene and the dark light scene can be distinguished based on a detected amount of light. In one example, in the normal light scene, the amount of light detected by the camera is greater than or equal to a designated amount. In the dark light scene, the amount of light detected by the camera is less than a designated amount.

The apparatus 200 may include a dual rear camera as shown in the FIG. 4. The apparatus 200 may include two image sensors such as Bayer sensor and a quadra sensor. When the camera is in normal light condition, the apparatus 200 may capture preview frames of a scene using the first camera (i.e., Bayer sensor) when the user launches camera application. Further, the apparatus 200 may determine ambient light conditions of the scene in response to receiving the preview frames. The apparatus 200 may switch the camera operation from the first camera to the second camera (i.e., quadra sensor), when the ambient light conditions are below the pre-defined threshold. The apparatus 200 may capture preview frames of the scene using the second camera and the apparatus 200 may switch the camera operation from the second camera to the first camera, when the ambient light conditions are above a pre-defined threshold. The apparatus 200 may again capture preview frames of the scene using the first camera.

Figure 5:
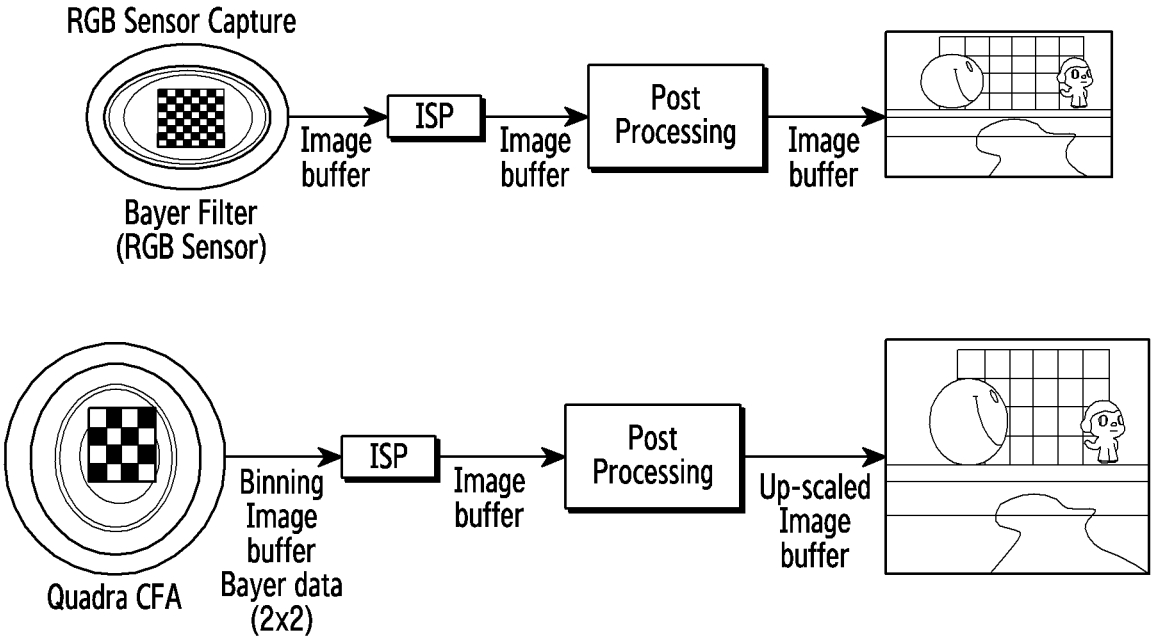
FIG. 5 is a diagram of differentiation between a first image sensor output and a second image sensor output, according to an embodiment.

FIG. 5 is a diagram of differentiation between a first image sensor output and a second image sensor output, according to an embodiment. The first image sensor is a Bayer sensor, and the second image sensor is a quadra sensor.

Referring to FIG. 5, the electronic device may obtain an image by using an image sensor including a bayer filter (hereinafter, a bayer sensor). For example, the electronic device may obtain the image including 64 pixels (8×8) by using the bayer sensor.

The electronic device may obtain an image by using an image sensor including a quadra color filter array (CFA) (hereinafter, a quadra sensor). For example, the quadra sensor may be used as a image sensor in low light scenario. The electronic device may obtain a binning image from the image comprising 64 (8×8) pixels by using the quadra sensor. The binning image may be an image in which pixel binning is performed in 2×2 units The quadra sensor may perform pixel binning (i.e. four adjacent same color pixels may be merged into one pixel). Accordingly, output pixels from the quadra sensor may be brighter than normal output.

Consequently, the quadra sensor may provide better bright pixels in low light condition. Further, as a result of pixel binning, an output size of the quadra sensor image buffer may be less as compared to an output size of Bayer sensor image buffer in case same sensor data size. Further, an up-scaling is performed to the received final output from the quadra sensor. Since the quadra sensor provides a relatively small output, the electronic device can perform up-scaling on the output data of the quadra sensor to provide the same output size. As an example, an electronic device can increase the resolution. Hereinafter, in order to explain various embodiments of the present disclosure, a bayer sensor is described as an example of an image sensor used in the normal light condition and a quadr sensor is described as an example of an image sensor used in the dark light condition, but not limited thereto. Embodiments of the present disclosure may be practiced with respect to at least two image sensors including a sensor capable of more clearly expressing an object in a relatively dark environment relative to the image sensor and the general image sensor.

Figure 6A:
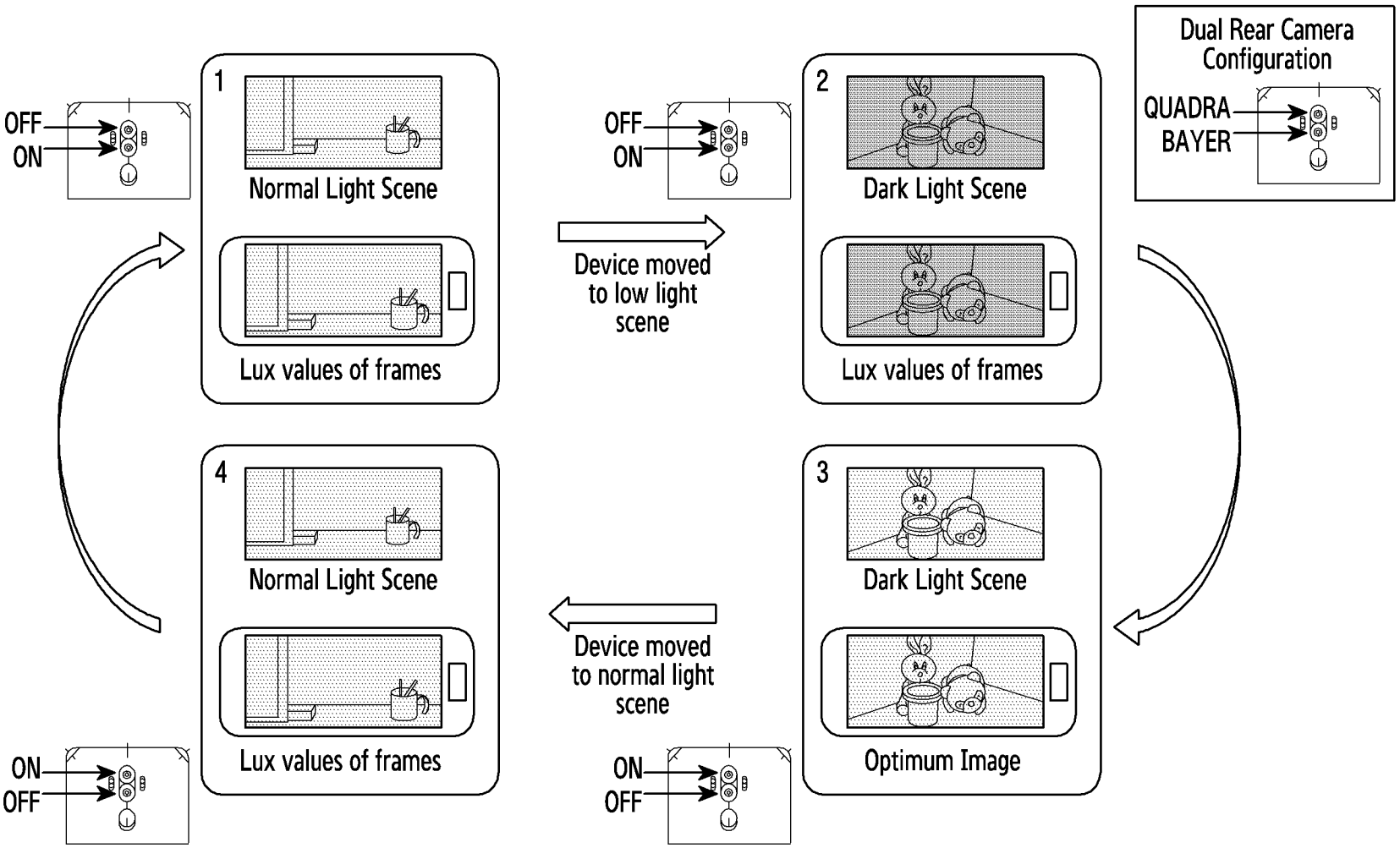
FIG. 6A is a diagram of an example scenario where an automatic switching of an image sensor is performed based on an ambient light condition, according to an embodiment.

FIG. 6A is a diagram of an example scenario, where automatic switching of image sensor is performed based on an ambient light condition, according to an embodiment.

The apparatus 200 may have the quadra sensor on the top and the Bayer sensor on the bottom of the back panel of the apparatus 200. The quadra sensor may perform pixel binning (i.e. four adjacent same color pixels may be merged into one pixel). Accordingly, output pixels from the quadra sensor may be brighter than normal output. The image sensor such as quadra sensor may include one or more mixing gates that may be in communication with two or more pixels. The mixing gates may couple two or more photodiodes together. The mixed photodiodes may have the same color filter (e.g., both have green filters) or may lack a color filter, or may have different color filters. The color features may be lost when the photodiodes are mixed, but the sensitivity may be increased. The mixing gates may selectively connect the photodiodes to allow the signal from two or more of the photodiodes to rebalanced among the various pixels. The charge for each of the photodiodes may then be read out selectively, such as by selectively activating the trigger transfer gates or may be read out collectively (activating all of the trigger transfer gates). The photodiodes may be activated and may begin collecting light from the lens. The photodiodes may be activated in groups or rows for a rolling shutter operation or may be activated simultaneously for a global shutter operation. The four pixels may each share a single readout region.

Initially, the quadra sensor may be switched OFF and the Bayer sensor may be switched ON. When apparatus 200 is in normal light condition, then the lux values of frames received from the Bayer sensor depict that the camera is in normal light condition. When the apparatus is moved to low light scene, the lux values of frames received from the Bayer sensor depict that the camera is in dark light condition. Based upon the lux values, the quadra sensor may be auto switched from the Bayer sensor. In dark light, the quadra sensor may provide better image(s).

When the apparatus 200 is moved to normal light scene from dark light scene, the lux values of the frames received from the quadra sensor show that the camera in normal light condition. Based upon the lux values, the Bayer sensor may be auto switched from the quadra sensor. In a normal light condition, the Bayer sensor may provide faster image capture compared to quadra sensor. In addition, the camera pipeline/processing of the images may be executed for one camera out of two cameras, to ensure less power consumption.

Figure 6B:
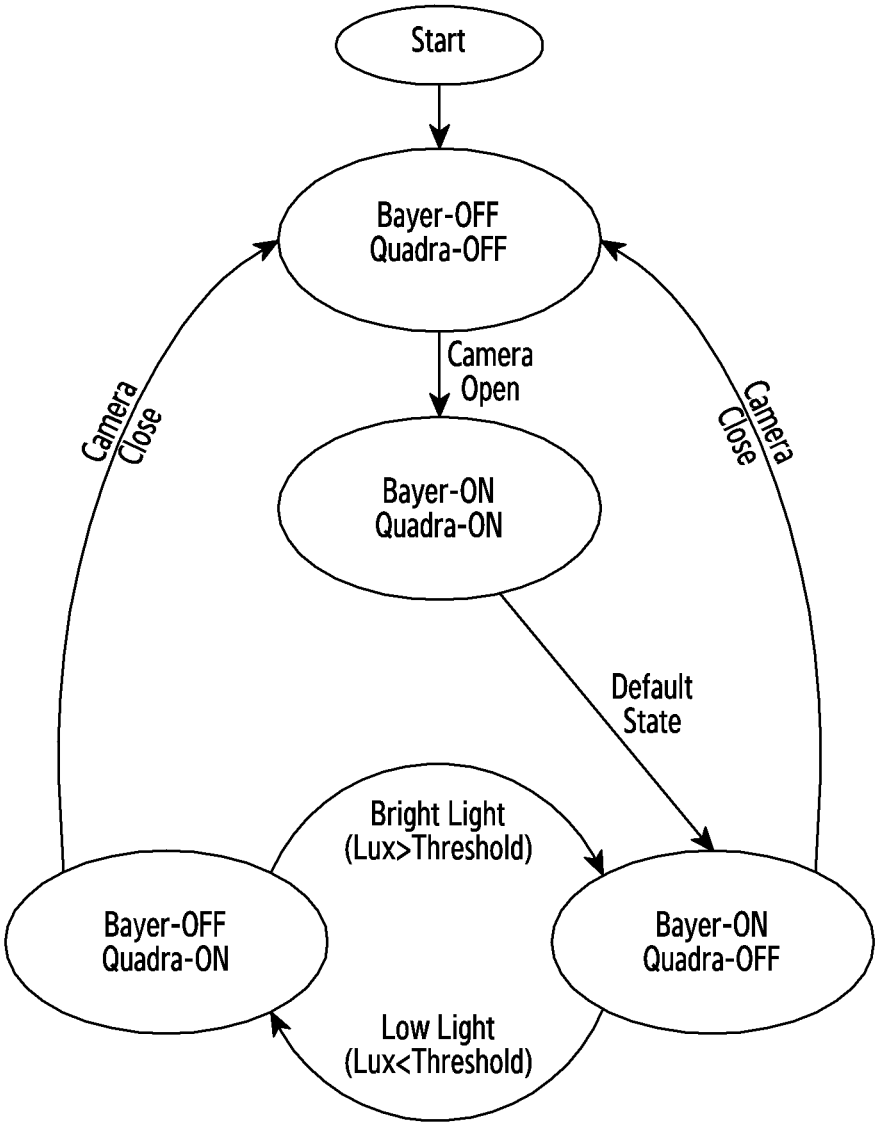
FIG. 6B is a diagram of automatic switching of the image sensor based on an ambient light condition, according to an embodiment.

FIG. 6B is a diagram of automatic switching of the image sensor based on ambient light condition, according to an embodiment. Hereinafter, ON and OFF may be referred to as activation/deactivation or normal power mode/low power operation mode. In other words, ON means a state in which the sensor can perform normal functions, and OFF means a state in which a sensor is unavailable to perform at least one of the normal functions.

When the camera is closed, both the Bayer sensor and the quadra sensor are switched OFF. When the camera is opened, both the Bayer sensor and the quadra sensor are switched ON. In one example, when the camera application is executed, the camera may be opened. Further, the apparatus 200 may initially consider that the camera is in normal light condition and the quadra sensor is switched OFF, by keeping the Bayer sensor still in ON state. In other words, the default state is that the bayer sensor is ON and the quadra sensor is OFF. If the Bayer sensor detects that the ambient light condition is under low light then the quadra sensor is switched ON and the Bayer sensor is switched OFF. Furthermore, the quadra sensor will check the ambient light condition and determines that the camera is in normal light condition, then the Bayer sensor is switched ON and the quadra sensor is switched OFF. If, the camera is closed, then both the image sensors are switched OFF.

Figure 7:
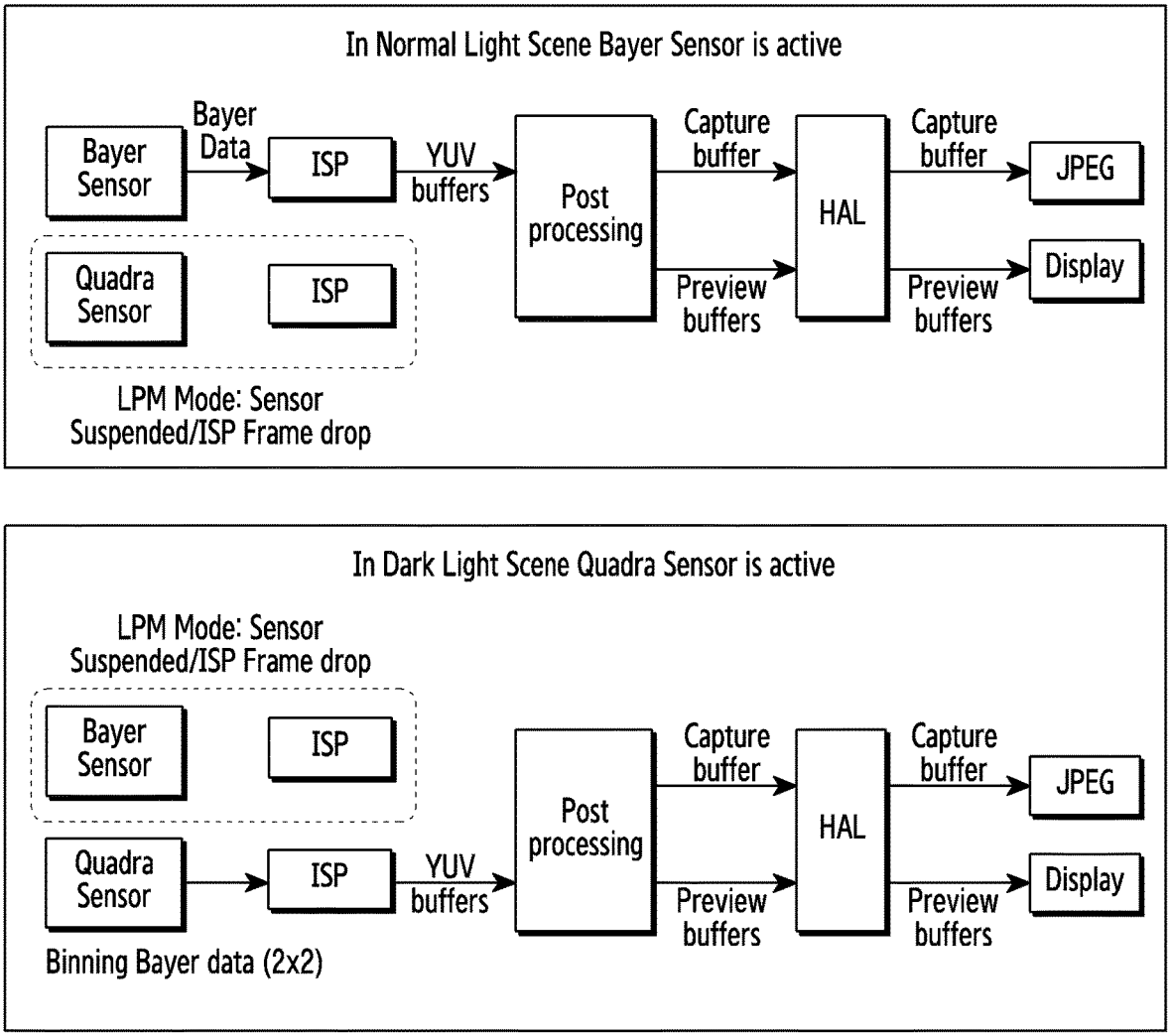
FIG. 7 is a diagram of automatic switching of image sensor based on an ambient light condition, according to an embodiment.

FIG. 7 is a diagram of automatic switching of the image sensor based on an ambient light condition, according to an embodiment.

Referring to FIG. 7, the above of the diagram represents functional blocks for image processing in case that the bayer sensor is an active state and the bottom of the below of the diagram represents functional blocks for image processing in case that the quadra sensor is an active state.

The Bayer sensor data is transmitted to the ISP. The qudar sensor may be entered into low power mode (LPM). The ISP can perform operations such as, but not limited to, Bayer transformation, demosaic processing, noise reduction, image sharpening, and so on. The ISP may transmit the processed image to YUV (luminance (Y) and two chrominance (UV) components) buffers. The YUV buffer may extract brightness information separately from the color information and reduce the transmission errors. The capture buffer and preview buffer may hold the image intermediately during the pipeline of the image. A hardware abstraction layer (HAL) can act as a logical division of code that serves as an abstraction layer between a physical hardware of the apparatus 200 and the software. It provides a device driver interface allowing a program to communicate with the hardware. The processed image is displayed on the display of the apparatus 200 or stored as a certain format (e.g., JPEG) accordingly. In addition, another image sensor may enter into low power mode (LPM), where at least one of the image sensors may not generate image frames or the images frames generated by the at least one image sensor in LPM may be discarded at the ISP.

The electronic device can activate the quadra sensor based on ambient light conditions. When the quadra sensor is active, quadra sensor data is sent to the ISP (Image Signal Processor). Quadra sensor data may be data in which the Bayer data are combined through pixel binning. Descriptions of functional blocks that are the same as/similar to the Bayer sensors are omitted. In order to achieve a seamless transition, one sensor may be deactivated after a certain duration from the activation of one sensor, rather than immediately deactivating (or entering into a low power mode) the other sensor upon activation. In this case, unlike FIG. 7, all the sensors are activated, and ISP and post processing can be performed, respectively.

Figure 8A:
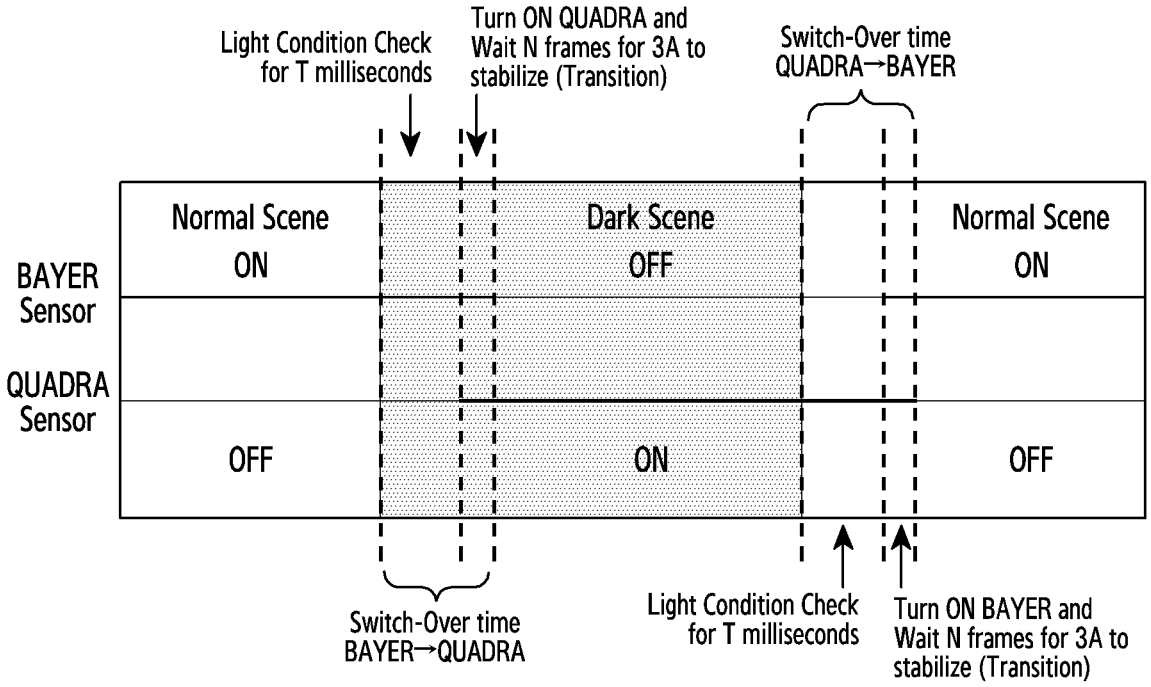
FIGS. 8A and 8B are diagrams of automatic switching of image sensor based on an ambient light condition, according to an embodiment.
Figure 8B:
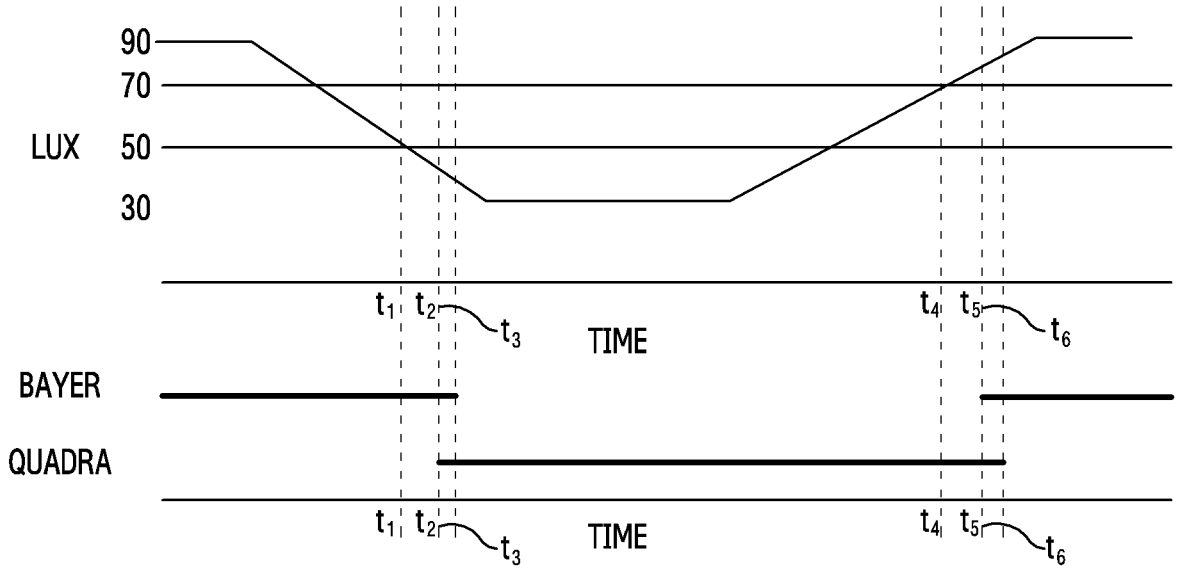

FIGS. 8A and 8B are diagrams of an automatic switching of image sensor based on an ambient light condition, according to an embodiment.

FIG. 8A depicts a logical representation of logic for automatic switching of the image sensor. In FIG. 8A, the upper part of the diagram may depict logic for the Bayer sensor and the lower part depicts logic for the quadra sensor.

The switching time comprises a light condition check duration (T) and a stabilization time (N). The light condition check duration 'T' can be time for light condition check duration that can be configured as per requirement. In one example, 'T' may be a millisecond-basis. The stabilization time is a waiting time for a stabilization after switching between sensors (or between cameras). For example, the stabilization time is the waiting time until at least one of 3As (auto focusing (AF), auto white balance (AWB), and auto exposure control (AEC) is stabilized and can be configured as per requirements. In one example, 'N' may be a frame-basis. Hereinafter, the switching from the first image sensor to the second image sensor means that the image sensor to be used for image acquisition uses the second image sensor instead of the first image sensor, and may not mean that the first image sensor is OFF immediately after turning ON the second image sensor.

The lux threshold condition to switch from Bayer sensor to quadra sensor can be '<BQlux'. '<BQlux' means that a lux value may be lesser than BQlux. That is, when the lux value detected by the bayer sensor is less thatn BQlux, the electronic device operates a camera equipped with the qudra sensor The lux threshold condition to switch from quadra sensor to Bayer sensor can be '>QBlux'. '>QBlux' means that a lux value may be greter than QBlux. That is, when the lux value detected by the quadra sensor is greater that QBlux, the electronic device operates a camera equipped with the bayer sensor.

The electronic device can determine the ambient light condition from the lux value detected through the sensor. The ambient light condition may include, for example, at least one of a bright light condition, a normal light condition, or a dark light condition. The electronic device may receive lux values for a monitoring period to determine ambient light conditions. The electronic device may determine a lux value for indicating the ambient light condition based on the received lux values for a monitoring period.

For example, the electronic device determines the ambient lighting condition by averaging the lux values received over the period of T (i.e. <BQlux or >QBlux). Also, in another example, the electronic device determines all lux values received over the period of T (i.e. <BQlux or >QBlux).

The stabilization time is required in switching between cameras. Here, the stabilization time may refer to a time interval for adjusting a default value of a camera setting in order to acquire an image through an activated camera (i.e., a drive-imitated camera). For example, the setting of the camera of the electronic device may be at least one of AF setting, AWB setting, and AEC setting described above. The electronic device may maintain the previous camera as active while the default value of the camera setting is adjusted. The electronic device may determine a default value for at least one parameter of the camera setting and then deactivate the previous camera.

Referring to the example shown in FIG. 8A, the wait time for 3A stabilization during switching to second image sensor can be determined either by a predefined value based of when sensor parameters 3A values are assumed to be stabilized within this frame numbers or waiting for 3A convergence before switching first sensor. The value of N is variable in this case based of the number of frames required for 3A to converge. Further, the lux threshold values are considered for switching of the camera operation. If surrounding lux is lesser than BQlux, then the quadra sensor may provide better images. If surrounding lux is greater than QBlux, then the Bayer sensor may provide better images.

FIG. 8B is a timing diagram for switching the camera operation. The above of the timing diagram represents lux values over time, and the bottom of the timing diagram represents sensor operations over time.

In an example, for the BQlux, the lux threshold value to switch from the Bayer sensor to the quadra sensor is 50. Also, for the QBlux, the lux threshold value to switch from the quadra sensor to the Bayer sensor is 70. The time duration to monitor if the ambient light condition is less than BQ lux is $t_2-t_1$, and the time duration to stabilize 3A for the quadra sensor is $t_3-t_2$. Further, the time duration to monitor, if the ambient light condition is more than QBlux is $t_5-t_4$, and the time duration to stabilize 3A for the Bayer sensor is $t_6-t_5$.

The electronic device may monitor ambient light condition(s) during $t_2-t_1$. The transition from the Bayer sensor to the quadra sensor may be determined based on the ambient light condition of the electronic device. The electronic device may activate the quadra sensor. Even if the quadra sensor is activated, it may take some time to stabilize the quadra sensor. Thus, the electronic device may keep the Bayer sensor active for $t_3-t_2$ hours. That is, both the Bayer sensor and the quadra sensor may be active for $t_3-t_2$. After $t_3$, the electronic device may turn off the Bayer sensor. In addition, using the activated quadra sensor, the electronic device may acquire an image including a clear object even in a dark environment. Thereafter, the electronic device may monitor the ambient light conditions during $t_5-t_4$. Based on the ambient light condition of the electronic device, the transition from the quadra sensor to the Bayer sensor may be determined. The electronic device may again activate the Bayer sensor. Even if the Bayer sensor is activated, it may take a certain time to stabilize the Bayer sensor. After $t_6$, the electronic device may turn off the quadra sensor. In addition, an image may be acquired using the activated Bayer sensor.

According to one embodiment, the lux threshold value BQlux for switching to the quadratic sensor may be configured differently from the lux threshold value QBlux for switching to the Bayer sensor. By considering hysteresis, camera switching can be prevented from being over-frequently switched. According to another embodiment, unlike the drawing, BQlux and QBlux may be configured the same.

According to one embodiment, the monitoring time $t_2-t_1$ and the stabilization time $t_3-t_2$ for switching to the quadra sensor are configured to be different from the monitoring time $t_4-t_3$ and stabilization time $t_5-t_4$. For example, the monitoring time may be determined based on the parameter(s) of the activated sensor. For example, the stabilization time may be determined based on the parameter(s) of the newly activated sensor. In one example, $t_2-t_1$ may be determined based on the parameter(s) of the Bayer sensor, and $t_3-t_2$ may be determined based on the parameter(s) of the quadra sensor. According to another embodiment, each stabilization time and each monitoring time may be configured with the same.

An electronic device according to various embodiments of the present disclosure may perform light-based adaptive camera switching. Adaptive camera switching may include an auto-switch. The electronic device may perform camera switching based on the detected light conditions.

The electronic device may provide seamless switching between cameras including a Bayer sensor and a camera including a Quadra sensor. The electronic device may provide a image smoothly until the quadra sensor operates stably by maintaining the Bayer sensor being activated even when the quadra sensor is activated. In other words, in order to prevent possible delays in the camera function due to deactivation of the Bayer sensor while the quadra sensor is turned on, the electronic device may maintain the Bayer sensor being active state for a period of time when the quadra sensor is activated. Similarly, when the Bayer sensor is activated, the active state of the quadra sensor may be maintained for a certain time interval. This time interval may be referred to as a stabilization time.

FIGS. 8A to 8B illustrate the 3A convergence time as the stabilization time, but the stabilization time may be determined in various other ways. In some embodiments, the stabilization time may be a predetermined value. For example, the stabilization time may be a fixed value (e.g., 10 ms).

In some other embodiments, the stabilization time may be configured based on the camera mode. The camera mode may be at least one of a continuous shooting mode, a moving image shooting mode, and a normal shooting mode. For example, when the quality of each image is relatively important (eg, normal shooting mode), the stabilization time may be configured relatively long. Through a long stabilization time, the electronic device may obtain high quality images using both sensors. Also, for example, in the case of a mode (e.g., a moving image shooting mode) in which battery saving is important due to shooting for a longer time than the quality of each image, the stabilization time may be set short.

In some other embodiments, the stabilization time may be determined based on the current light condition. The electronic device can determine the stabilization time based on the lux value obtained during the monitoring time. For example, it may take a long time to stabilize a camera by the difference between the current light condition and the threshold value. The electronic device can determine the stabilization time based on the current light condition and the threshold difference.

In some other embodiments, the stabilization time may be determined according to sensor performance. The sensor may be a sensor that is activated according to the camera switching. For example, as the sensor is sensitive to changes in light, the stabilization time can be short. If the light detection parameters of each of the sensors are different, the stabilization time can be configured differently FIG. 9A is a diagram of an example scenario, where a video recording is performed in varied light conditions, according to an embodiment.

Figure 9A:
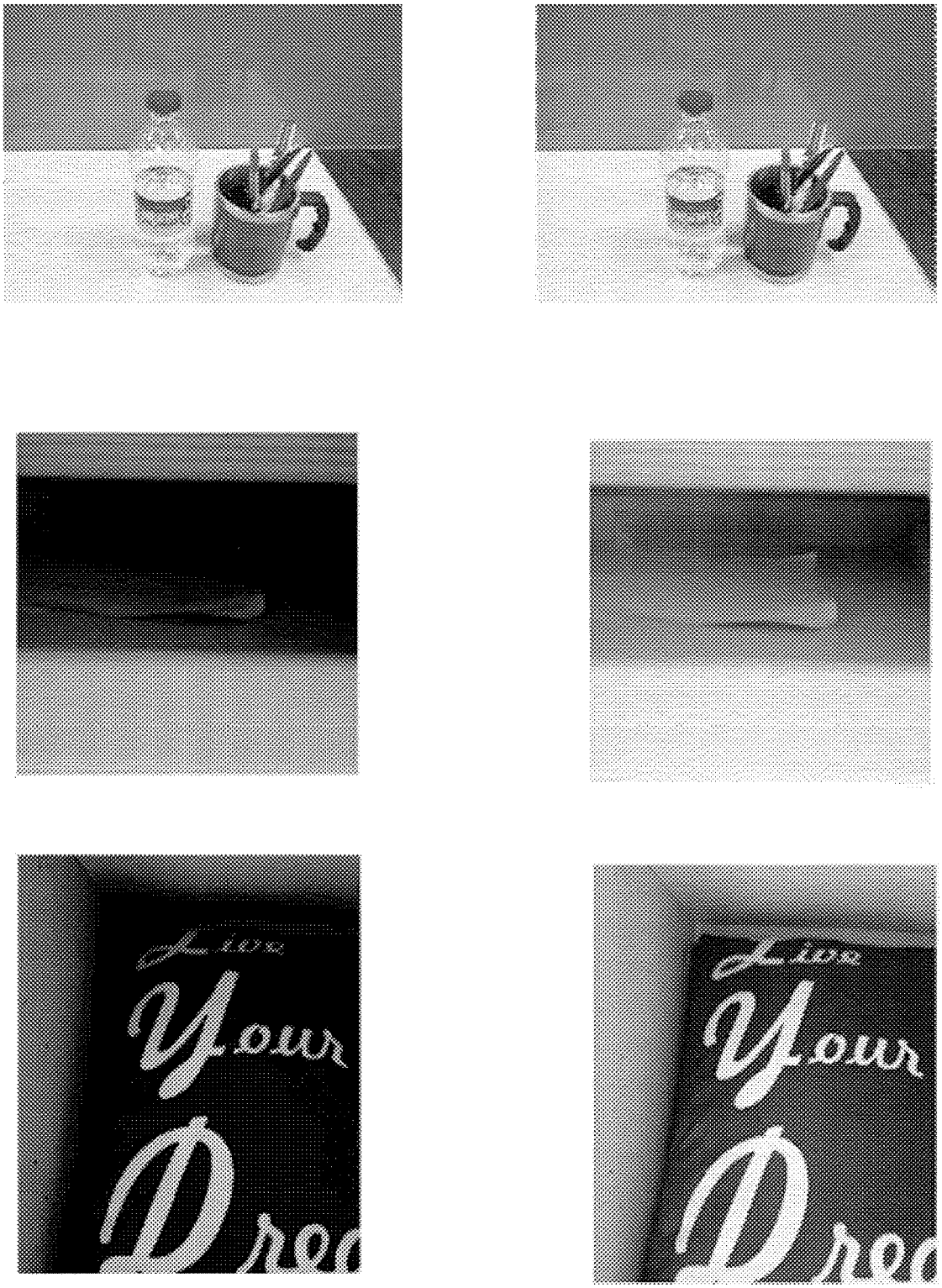
FIG. 9A is a diagram of an example scenario where a video recording is performed in varied light conditions, according to an embodiment.

Referring to FIG. 9A, the electronic device can perform video recording. The video recording is started in normal light condition and gradually the apparatus 200 moves to a dark light scenario as shown in FIG. 9A. The left hand side of the diagram depicts video recording with a single Bayer sensor and the right hand side of the diagram depicts video recording with both Bayer and quadra sensors. That is, on the right side of the diagram, the electronic device can perform video recording by adaptively switching the Bayer sensor and the Quadra sensor according to the light condition. Here, the light condition may include the ambient light condition acquired by the sensor of the electronic device. As an example, on the right side of the diagram, the electronic device may be in a state where the electronic device's auto-switching function is activated. On the right hand side of the diagram, the electronic device may, by switching from the Bayer sensor to the quadra sensor automatically based on the ambient light condition, obtain better video quality when the video is recorded in varying light conditions.

Figure 9B:
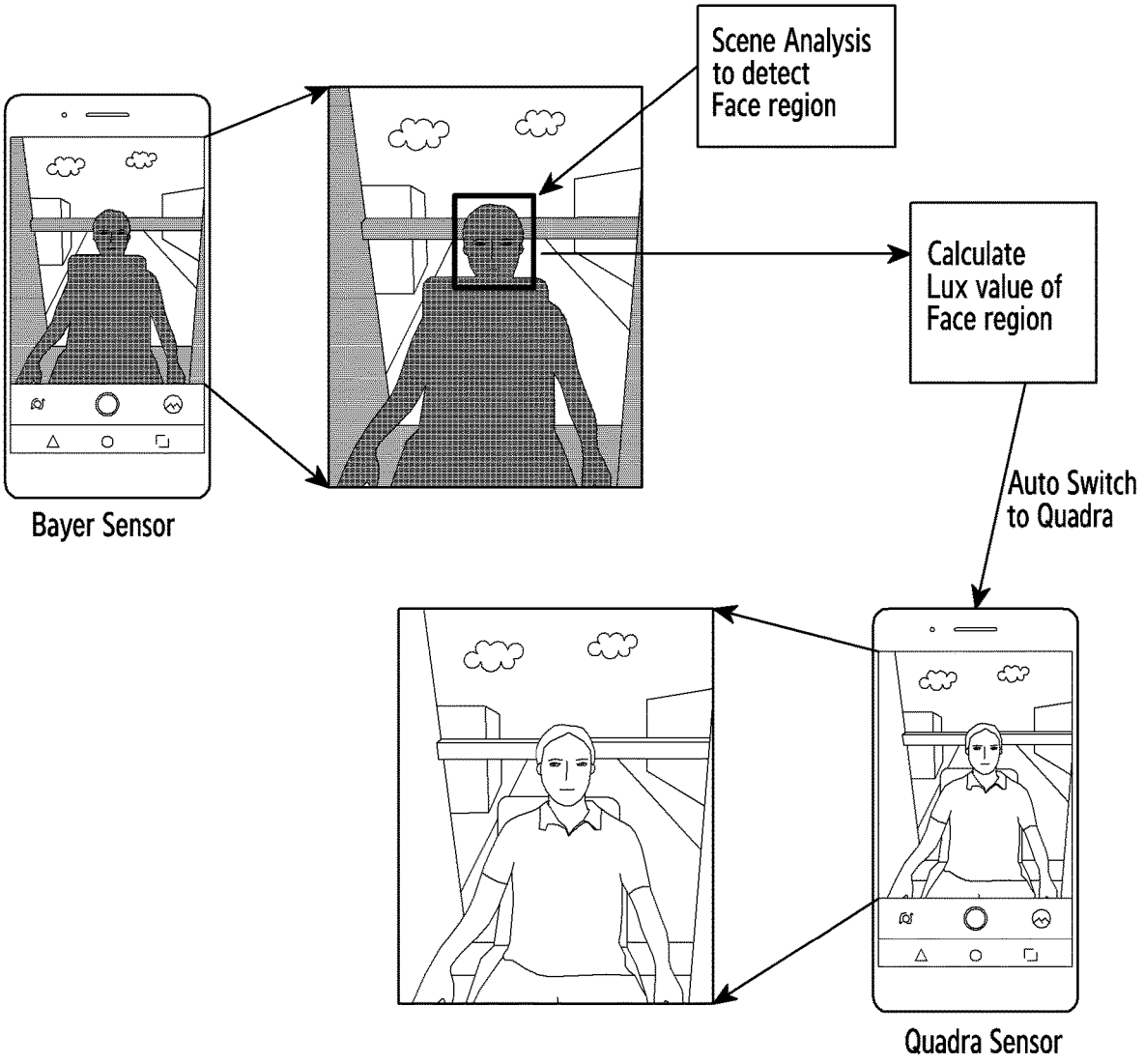
FIG. 9B is a diagram of an example scenario where switching of image sensor is executed based on light conditions on the face area in an image, according to an embodiment.

FIG. 9B is a diagram of an example scenario, where switching of image sensor is executed based on light conditions on the face area in an image, according to an embodiment.

Referring to FIG. 9B, the electronic device can capture an image using a Bayer sensor. The scenes with highly variable lighting may include both bright well-lit objects and dark shadowed objects. The electronic device can detect the face area from the captured image. The electronic device can obtain the lux value of the face area. As an example, a software module of the electronic device may calculate the lux value of the face area. The electronic device may determine whether to auto-switch to a quadratic sensor based on the calculated lux value. In normal light conditions, if face is detected as being dark, then the quadra sensor is switched ON to ensure that the face region is considerably less dark as compared to the Bayer sensor image(s). Specifically, without user intervention, the electronic device can activate the quadra sensor based on the lux value of the face region (face area). The electronic device can switch from a Bayer sensor to a Quadra sensor if the Lux value is less than the designated value. Because the face needs to be brightly detected in case of human-pictures (e.g., portraits).

Figure 9C:
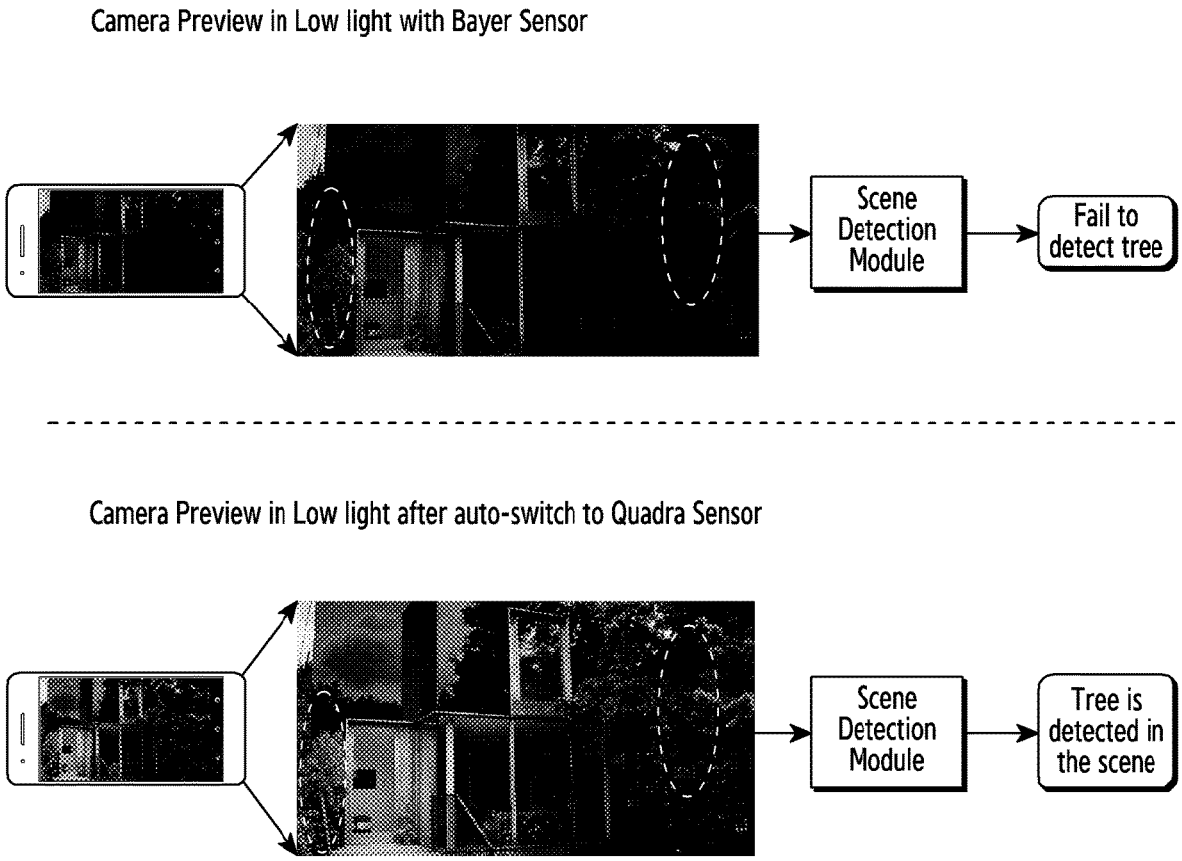
FIG. 9C is a diagram of an example scenario where a light condition in scene is detected during low light, according to an embodiment.

FIG. 9C is a diagram of an example scenario, where a light condition in scene is detected during low light, according to an embodiment.

Referring to FIG. 9C, the electronic device can obtain a preview image. A scene in which an object is more clearly expressed among a plurality of preview images can be detected. Sufficient light is required for the object to be more clearly represented. When using scene detection algorithms, auto-switching according to embodiments of the present disclosure may be used. The electronic device can use at least one sensor by a switching between sensors the sensor according to the amount of light. If the scene is detected by the apparatus 200, the Bayer sensor may provide a dark image output without highlighting the objects in the scene with dark ambient light condition. However, the quadra sensor may output a bright image with highlighting the objects in the scene. Thus, when a low light condition is detected, the electronic device can automatically switch the sensor to a quadra sensor. By outputting a brighter image in a dark environment, a clearer scene can be detected even in the dark environment.

Figure 9D:
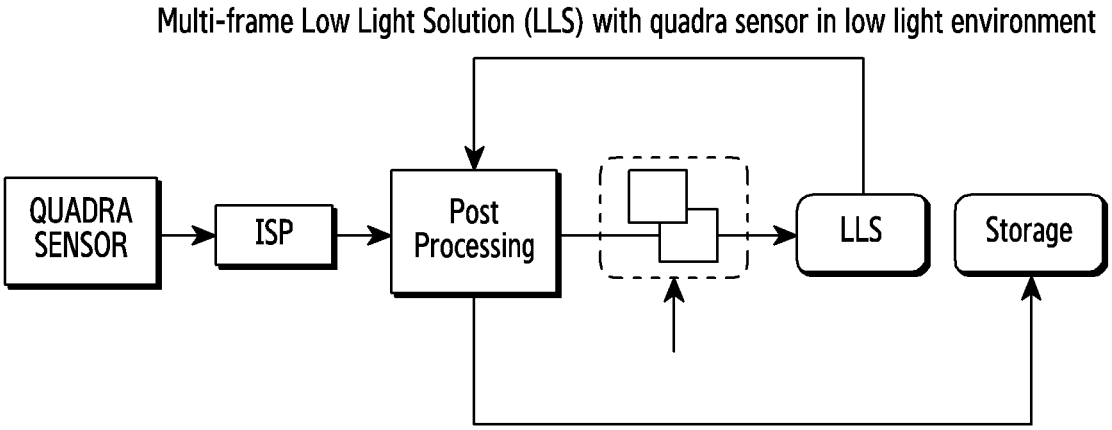
FIG. 9D is a diagram of an example scenario for providing optimized low light solution (LLS), according to an embodiment.

FIG. 9D is a diagram of an example scenario for providing optimized LLS, according to an embodiment.

Referring to FIG. 9D, The bright frames with less noise from the quadra sensor may be transmitted to a LLS module that may need approximately 200 milliseconds to process two frames. The LLS block can be a library that may be used for low light photography. The LLS block may obtain multiple frames as input(s) and perform post processing. The LLS block may further apply frame fusion to generate better quality output frame. When the apparatus 200 is in a low light scene, auto switching to the quadra sensor is performed. Further, less number of frames may be required by LLS module by virtue of quadra sensor providing better images in dark light conditions.

Figure 1B:
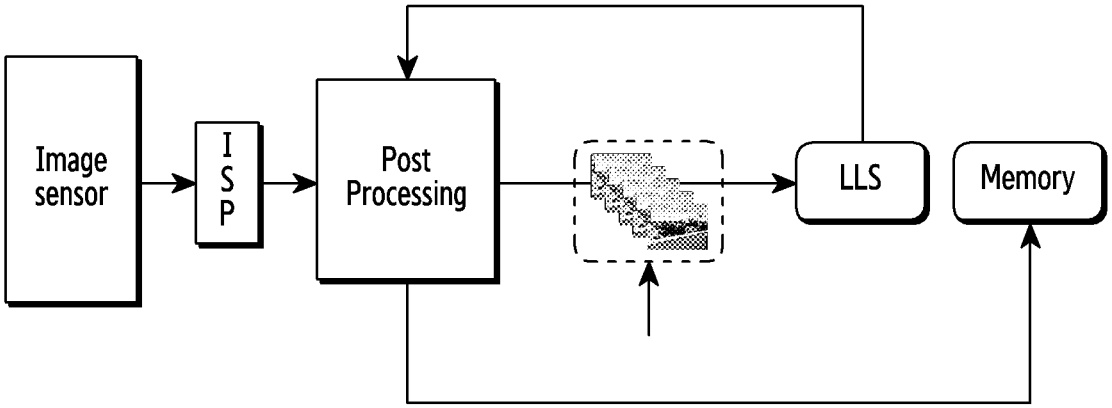
FIG.1B (PRIOR ART)
FIG. 1B is a diagram of a conventional solution for optimal low light image.

As a specific example, referring to FIG. 1B described above, the LLS block took about 500 ms to process five frames. However, by using the quadra sensor through the scheme of FIG. 9D, it can take only 200 ms. By using quadra sensors, relatively bright images are output compared to the Bayer sensor, so that the noise components of images are relatively small. The number of frames required for image processing is reduced, and the processing time can be reduced.

In the present disclosure, it has been shown that the Bayer sensor and the quadrature sensor are adaptively switched, but the further operation of acquiring the media (e.g., image) by activating both sensors in a certain case can also be understood as an embodiment. Although the present disclosure describes a Bayer sensor and a Quadra sensor as an example, various embodiments of the present disclosure include an electronic device (or camera) having at least two sensors (or cameras) having a performance metric differentiated according to the light condition.

Figure 10A:
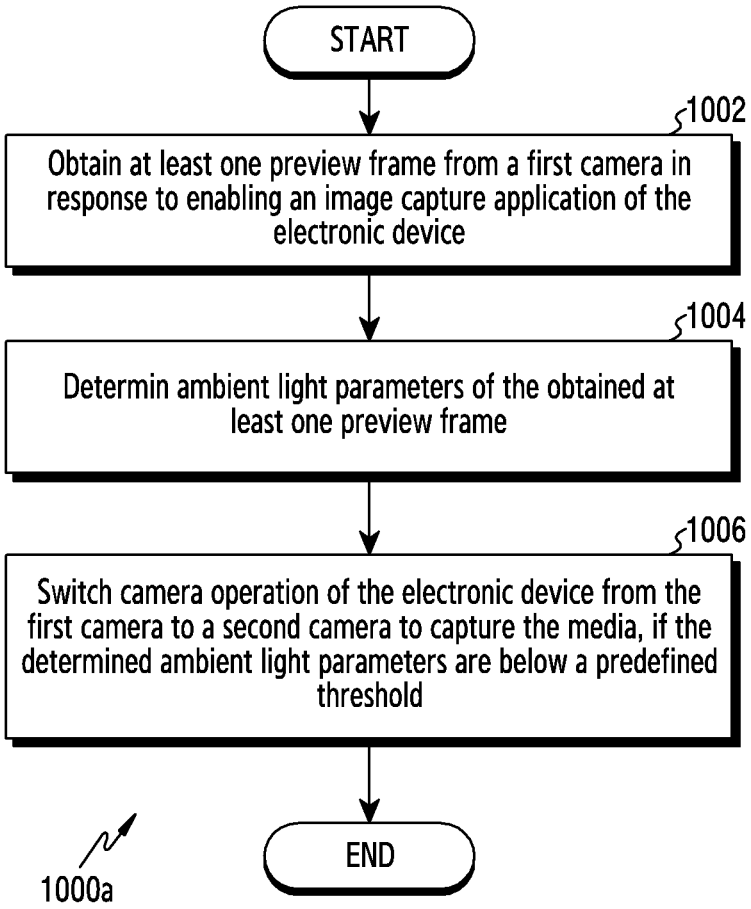
FIG. 10A is a flowchart of a method for capturing media using a plurality of cameras associated with an electronic device, based on an ambient light condition, according to an embodiment.

FIG. 10A is a flowchart of a method 1000a for capturing media using at least two cameras associated with an electronic device 200, based on an ambient light condition, according to an embodiment. At step 1002, the method 1000a includes obtaining at least one preview frame from a first camera in response to enabling an image capture application of the electronic device 200. At step 1004, the method 1000a includes determining an ambient light parameters of the obtained at least one preview frame. At step 1006, the method 1000a include switching a camera operation of the electronic device 200 from the first camera to a second camera to capture the media, if the determined ambient light parameters are below a pre-defined threshold.

The various actions in method 1000a may be performed in the order presented, in a different order or simultaneously. Further, in some embodiments, some actions listed in FIG. 10A may be omitted.

Figure 10B:
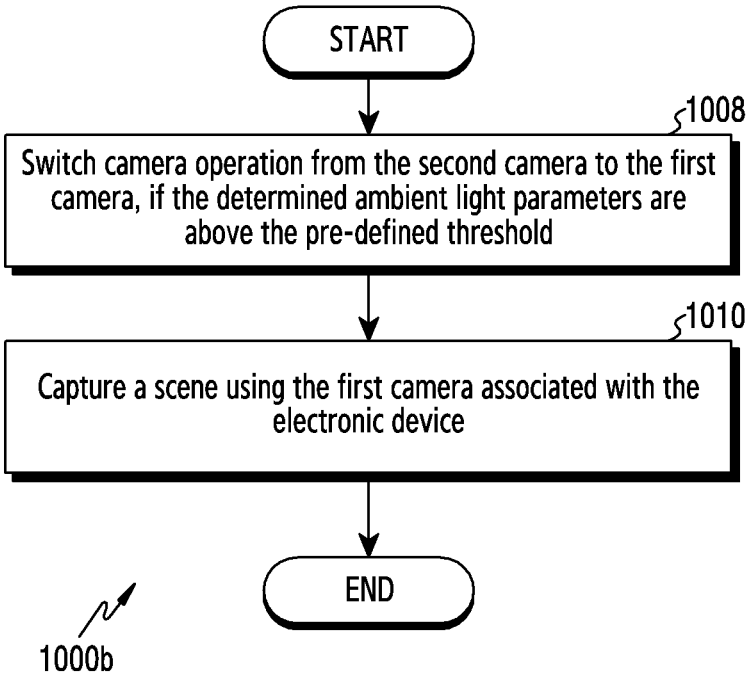
FIG. 10B is a flowchart of a method for switching a camera operation from second camera to first camera, according to an embodiment.

FIG. 10B is a flowchart of a method 1000b for switching a camera operation from second camera to first camera, according to an embodiment.

At step 1008, the method 1000b includes switching camera operation from the second camera to the first camera, if the determined ambient light parameters are above the pre-defined threshold. At step 1010, the method 1000b includes capturing a scene using the first camera associated with the electronic device 200.

The various actions in method 1000b may be performed in the order presented, in a different order or simultaneously. Further, in some embodiments, some actions listed in FIG. 10B may be omitted.

Figure 10C:
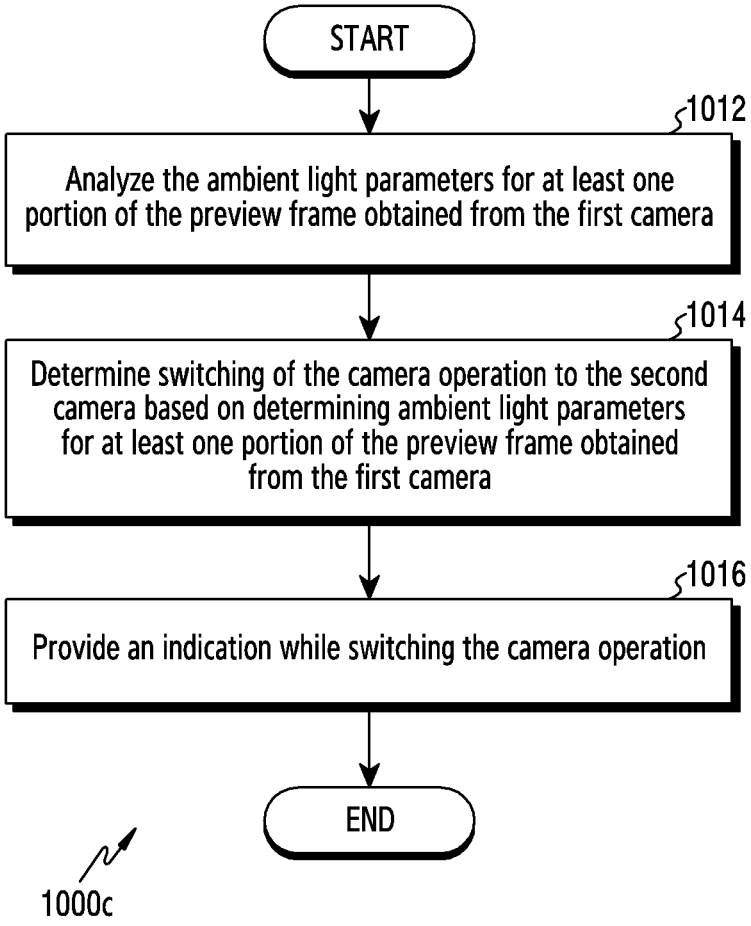
FIG. 10C is a flowchart of a method for providing an indication while switching the camera operation, according to an embodiment.

FIG. 10C is a flowchart of a method 1000c for providing an indication while switching the camera operation, according to an embodiment.

At step 1012, the method 1000c includes analyzing the ambient light parameters for at least one portion of the preview frame obtained from the first camera. At step 1014, the method 1000c includes determining a switching of the camera operation to the second camera, based on determining the ambient light parameters for at least one portion of the preview frame obtained from the first camera. At step 1016, the method 1000c includes providing an indication while switching the camera operation.

The various actions in method 1000c may be performed in the order presented, in a different order or simultaneously. Further, in some embodiments, some actions listed in FIG. 10C may be omitted.

Figure 10D:
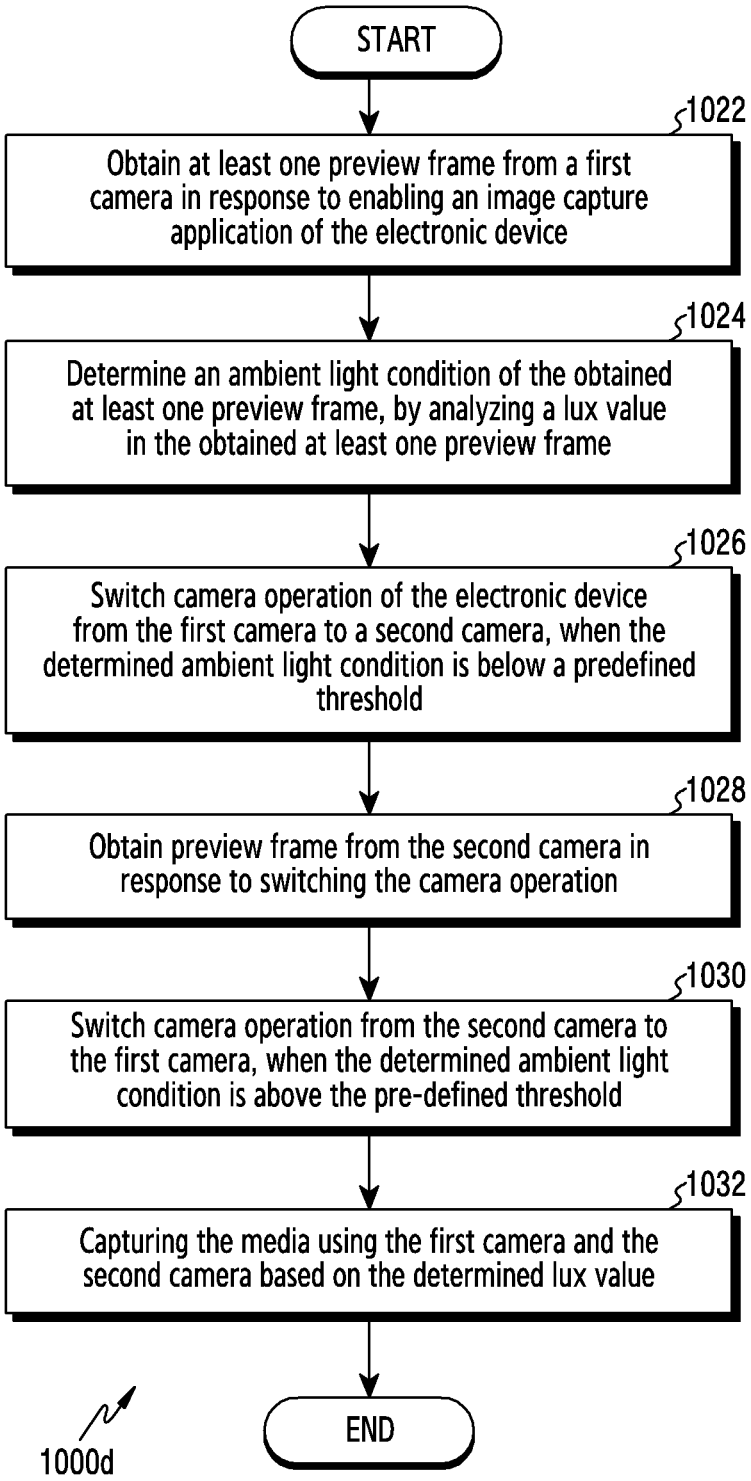
FIG. 10D is a flowchart of a method for obtaining preview frame from the second camera in response to switching the camera operation, according to an embodiment.

FIG. 10D is a flowchart of a method for obtaining preview frame from the second camera in response to switching the camera operation, according to an embodiment.

At step 1022, the method 1000d includes obtaining, by the electronic device 200, at least one preview frame from a first camera in response to enabling an image capture application of the electronic device 200. At step 1024, the method 1000d includes determining, by the electronic device 200, an ambient light condition of the obtained at least one preview frame, by analyzing a lux value in the obtained at least one preview frame, where the lux value comprises ambient light condition. At step 1026, the method 1000d includes switching, by the electronic device 200, a camera operation of the electronic device from the first camera to a second camera, when the determined ambient light condition is below a first pre-defined threshold. At step 1028, the method 1000d includes obtaining, by the electronic device 200, preview frame from the second camera in response to switching the camera operation. At step 1030, the method 1000d includes switching, by the electronic device 200, the camera operation from the second camera to the first camera, when next ambient light condition is above a second pre-defined threshold. At step 1032, the method 1000d includes capturing, by the electronic device 200, the media using the first camera and the second camera based on the determined lux value.

The various actions in method 1000d may be performed in the order presented, in a different order or simultaneously. Further, in some embodiments, some actions listed in FIG. 10D may be omitted.

Figure 10E:
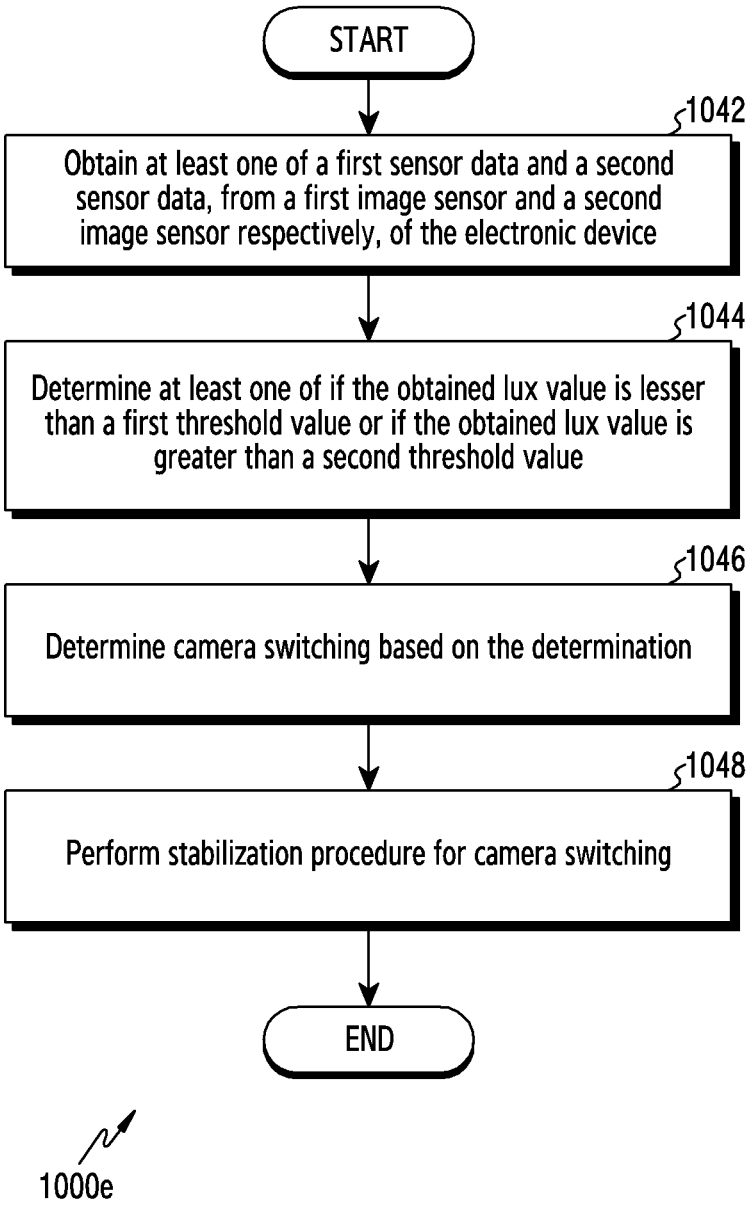
FIG. 10E is a flowchart of a method for switching a camera operation based on determined ambient light condition, according to an embodiment.

FIG. 10E is a flowchart of a method 1000e for switching a camera operation based on determined ambient light condition, according to an embodiment.

At step 1042, the method 1000e includes obtaining, by the electronic device 200, at least one of a first sensor data and a second sensor data, from a first image sensor and a second image sensor respectively, of the electronic device 200. In other words, the electronic device 200 obtains the first sensor data from the first image sensor. The electronic device 200 obtains the second sensor data from the second image sensor. For example, the first sensor data and the sensor data comprises a lux value determined for 'T' milliseconds at each image sensor. In another example, the first sensor data comprises a lux value determined for '$T_1$' milliseconds at the first image sensor and the second sensor data comprises a lux value determined for '$T_2$' milliseconds at the second image sensor.

At step 1044, the method 1000e includes determining, by the electronic device 200, at least one of if the obtained lux value is lesser than a first threshold value or if the obtained lux value is greater lesser than the second threshold value. The electronic device 200 determines whether the obtained lux value is smaller than the first threshold value or not. Also, the electronic device 200 determines whether the obtained lux value is greater than the second threshold value or not.

At step 1046, the method 1000e includes determining a camera switching based on the determined lux value. In one example, the method 1000e includes switching, by the electronic device 200, from the first camera to the second camera, if the determined lux value is less than the first threshold value. In another example, the method 1000e includes switching, by the electronic device 200, from the second camera to the first camera, if the determined lux value is greater than the second threshold value.

At step 1048, the method 1000e includes performing a stabilization procedure for camera switching. The stabilization procedure is a procedure where default parameter(s) is adjusted such that the camera (i.e., image sensor) activated according to the camera switching can work seamlessly. The method 1000e includes stabilizing, by the electronic device 200, for 'N' frames, the switched at least one of the first camera and the second camera, by waiting for a 3A convergence time, where the 3A convergence time comprises a duration for adjusting at least one of an AF, an AWB, and an AEC.

The various actions in method 1000e may be performed in the order presented, in a different order or simultaneously. Further, in some embodiments, some actions listed in FIG. 10E may be omitted.

Figure 10F:
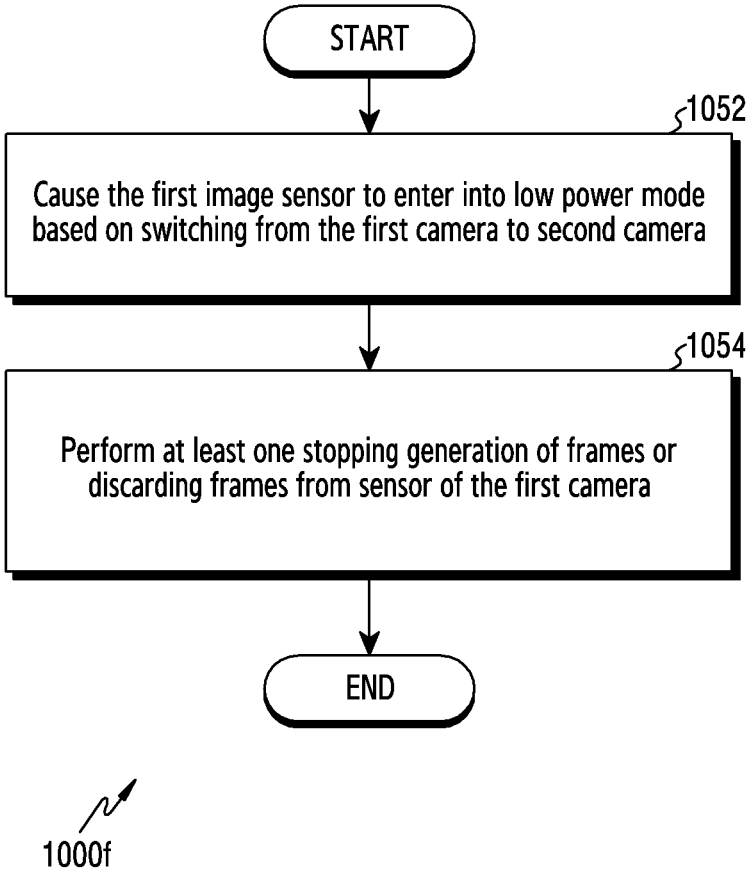
FIG. 10F is a flowchart of a method for causing at least one of a first image sensor and a second image sensor to enter into low power mode, when not in use, according to an embodiment.

FIG. 10F is a flowchart of a method 1000f for causing at least one of the first image sensor and the second image sensor to enter into low power mode, when not in use, according to an embodiment.

At step 1052, the method 1000f includes causing, by the electronic device 200, at least one of the first image sensor and the second image sensor to enter into low power mode, based on determining the switch between the first camera and the second camera. At step 1054, the method 1000f includes performing, by the electronic device 200, at least one of stop generating frame from sensor and discard frames by an ISP received from at least one of the first camera and the second camera. Here, the sensor is a sensor that enters into the low-power mode, which may be the sensor that was in use before switching. In one example, when the electronic device 200 moves into the dark light condition, the first camera sensor may be the Bayer sensor. In one example, when the electronic device 200 moves into the normal light condition, the first camera sensor may be the Quadra sensor.

Although not shown in FIG. 10F, the method 1000f includes determining, by the electronic device 200, the lux value based on the obtained plurality of the preview frames from at least one of the first camera and the second camera, after causing at least one of the first camera and the second camera to enter into low power mode. And, the method 1000f includes switching, by the electronic device 200, between the first camera and the second camera, if the determined the lux value is at least one of greater and lesser than at least one of the first threshold value and the second threshold value respectively. For example, the electronic device switches the first camera to the second camera when the lux value is less than the first threshold value. Also for example, the electronic device switches the second camera to the first camera if the lux value is greater than a second threshold.

The various actions in method 1000f may be performed in the order presented, in a different order or simultaneously. Further, in some embodiments, some actions listed in FIG. 10F may be omitted.

Figure 10G:
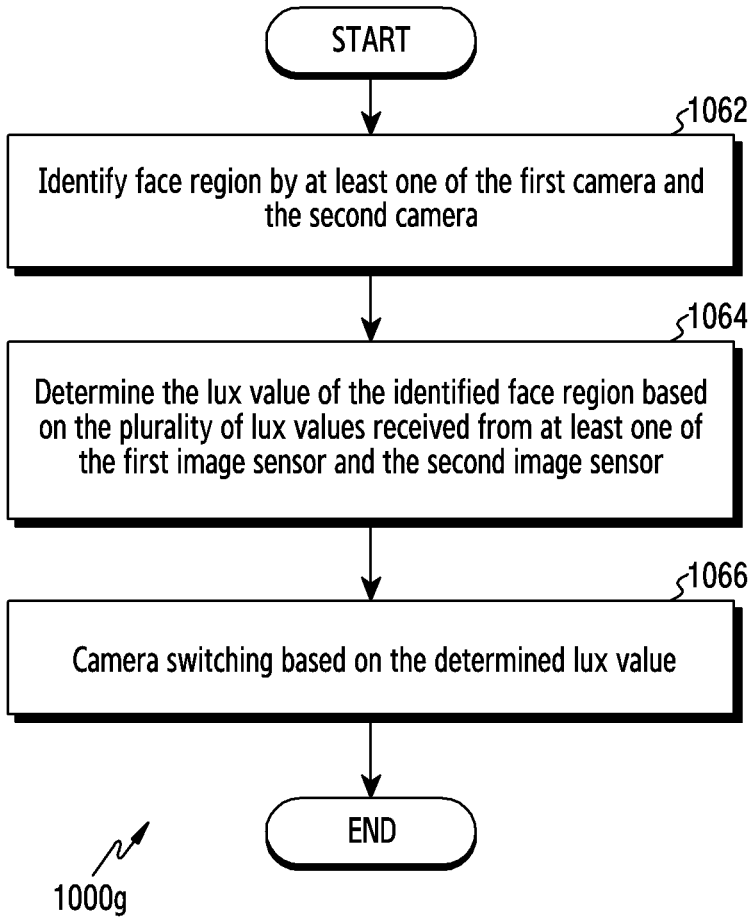
FIG. 10G is a flowchart of a method for identifying at least one of a face and a scene in the image, according to an embodiment.

FIG. 10G is a flowchart of a method 1000g for identifying at least one of a face and a scene in the image, according to an embodiment.

At step 1062, the method 1000g includes identifying, by the electronic device 200, at least one of a face region (i.e., a scene associated with a face) in the image, by at least one of the first camera and the second camera. At step 1064, the method 1000g includes determining, by the electronic device 200, the lux value of the identified face region and scene based on the received plurality of lux values from at least one of the first image sensor and the second image sensor. At step 1066, the method 1000g includes performing camera switching based on the determined lux value. The method 1000g includes switching, by the electronic device 200, from at least one of the first camera to the second camera and from the second camera to the first camera, if the determined lux value of the detected face and scene is at least one of greater and lesser than the at least one of the first threshold value and the second threshold value. Specifically, the electronic device switches from the first camera to the second camera when the determined lux value is less than the first threshold value. Conversely, the electronic device switches from the second camera to the first camera if the determined lux value is above the second threshold.

The various actions in method 1000g may be performed in the order presented, in a different order or simultaneously. Further, in some embodiments, some actions listed in FIG. 10G may be omitted.

Although FIGS. 2 to 10G describe the operations of capturing media by selectively activating at least one of image sensors during camera shooting, additional sensors other than the image sensors may be utilized.

In some embodiments, the electronic device may perform adaptive camera switching based on a gyro sensor in addition to the image sensor for determining ambient light conditions. The electronic device may obtain the lux values during the monitoring time to determine the ambient light conditions. At this time, the electronic device can consider the detection result of the gyro sensor. The gyro sensor can detect the posture of the electronic device. The electronic device can increase the reliability of the ambient light condition according to the detected lux value by determining whether the posture of the electronic device is maintained during the monitoring time. For example, if the posture (attitude) of the electronic device changes within the monitoring time (e.g., Tms), the electronic device may not switch from the Bayer sensor to the quadra sensor, even if an under-lux value is detected. The electronic device can again monitor ambient light conditions.

Also, in some embodiments, the electronic device can perform adaptive camera switching in accordance with various embodiments based on a grip sensor. The grip sensor may detect which area of the electronic device the user is holding. The electronic device can determine whether to switch between the Bayer sensor and the quadratic sensor based on the detection result of the grip sensor. The electronic device can minimize unnecessary malfunction through the grip sensor.

In this disclosure, to determine whether a particular condition is fulfilled or not, 'greater than or equal to' or 'lesser than or equal to' expressions have been used, but this is merely an example of expressing an embodiment and does not exclude a description of excess or less. Conditions described as 'greater than or equal to' may be replaced by 'greater than', 'lesser than or equal to' may be replaced by 'lesser than'.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An apparatus comprising:

*a first camera;*

*a second camera;* at least one memory configured to store instructions; and at least one processor, wherein the at least one processor is, when the instructions are executed, configured to:

obtain at least one preview frame from [a] *the* first camera in response to enabling an image capture application of an electronic device;

determine a first ambient light parameter of the obtained at least one preview frame;

activate [a] *the* second camera, in response to the determined first ambient light parameter being lower than a first pre-defined threshold;

perform a setting of the second camera within a time interval between the activation of the second camera and a deactivation of the first camera, wherein the time interval [is determined based on a difference between the determined first ambient light parameter and the first pre-defined threshold] *includes a duration for adjusting at least one of auto focusing* (*AF*) *setting, automatic white balancing* (*AWB*) *setting, or automatic exposure controlling* (*AEC*) *setting*;

deactivate the first camera after the time interval; and

*control to* capture a scene using the second camera associated with the electronic device, wherein the first camera comprises a first image sensor which provides a first sensitivity, wherein the second camera comprises a second image sensor which provides a second sensitivity, and wherein the second sensitivity is higher than the first sensitivity.

2. The apparatus of claim 1, wherein the at least one processor is further configured to:

determine a second ambient light parameter by using the second camera;

activate the first camera, in response to the determined second ambient light parameter being above a second pre-defined threshold;

perform a setting of the first camera within an another time interval between the activation of the first camera and a deactivation of the second camera, wherein the another time interval [is determined based on a difference between the determined second ambient light parameter and the second pre-defined threshold] *includes another duration for adjusting at least one of the AF setting, the AWB setting, or the AEC setting*;

deactivate the second camera after the another time interval; and capture a scene using the first camera associated with the electronic device, wherein the second pre-defined threshold is greater than the first pre-defined threshold.

3. The apparatus of claim 1, wherein the at least one processor is further configured to:

analyze the first ambient light parameter for at least one portion of a preview image obtained from the first camera; *and* determine a switching of a camera operation from the first camera to the second camera based on determining of the first ambient light parameter for at least one portion of the preview image obtained from the first camera[; and provide an indication while the switching of the camera operation].

4. The apparatus of claim 1, wherein the first image sensor comprises a bayer sensor, and wherein the second image sensor comprises a quadra sensor.

5. The apparatus of claim 1, wherein the first ambient light parameter comprises at least one of a lux value, a sensor data, a scene analysis data, a face recognition data, and a light intensity.

[6. The apparatus of claim 1, wherein the setting of the second camera comprises at least one of an automatic focus (AF) setting, an automatic white balance (AWB) setting, or an automatic exposure control (AEC) setting.]

7. The apparatus of claim 1, wherein the at least one processor is further configured to:

cause the first image sensor to enter into low power mode in response to the activation of the second camera; and perform at least one of stopping generating frame from the first image sensor and discarding frames by an image signal processor (ISP) received from the first camera.

[8. The apparatus of claim 1, wherein the at least one processor is, to determine the first ambient light parameter, configured to:

identify a face region of the at least one preview image; and determine a lux value of the identified face region as the first ambient light parameter.]

9. The apparatus of claim 1, wherein the first image sensor is configured to output data for pixels, and wherein the second image sensor is configured to output binning data by combining pixels based on a pixel binning.

10. The apparatus of claim 1, wherein the at least one processor is further configured to:

perform a process of highlighting an object in the captured scene using the second camera.

11. A method comprising:

obtaining at least one preview frame from a first camera in response to enabling an image capture application of an electronic device;

determining a first ambient light parameter of the obtained at least one preview frame;

activating a second camera, in response to the determined first ambient light parameter being lower than a first pre-defined threshold;

performing a setting of the second camera within a time interval between the activation of the second camera and a deactivation of the first camera, wherein the time interval [is determined based on a difference between the determined first ambient light parameter and the first pre-defined threshold] *includes a duration for adjusting at least one of auto focusing (AF) setting, automatic which balancing (AWB) setting, or automatic exposure controlling (AEC) setting*;

deactivating the first camera after the time interval; and capturing a scene using the second camera associated with the electronic device, wherein the first camera [comprises] *includes* a first image sensor which provides a first sensitivity, wherein the second camera [comprises] *includes* a second image sensor which provides a second sensitivity, and wherein the second sensitivity is higher than the first sensitivity.

12. The method of claim 11, further comprising:

determining, by the electronic device, a second ambient light parameter by using the second camera;

activating the first camera, in response to the determined second ambient light parameter being above a second pre-defined threshold;

performing a setting of the first camera within an another time interval between the activation of the first camera and a deactivation of the second camera, wherein the another time interval [is determined based on a difference between the determined second ambient light parameter and the second pre-defined threshold] *includes another duration for adjusting at least one of the AF setting, the AWB setting, or the AEC setting*;

deactivating the second camera after the another time interval; and capturing, by the electronic device, a scene using the first camera associated with the electronic device, wherein the second pre-defined threshold is greater than the first pre-defined threshold.

13. The method of claim 11, further comprising:

analyzing, by the electronic device, the first ambient light parameter for at least one portion of a preview image obtained from the first camera; *and* determining, by the electronic device, a switching of a camera operation from the first camera to the second camera based on determining of the first ambient light parameter for at least one portion of the preview image obtained from the first camera[; and providing, by the electronic device, an indication while the switching of the camera operation].

14. The method of claim 11, wherein the first image sensor [comprises] *includes* a Bayer sensor, and wherein the second image sensor [comprises] *includes* a quadra sensor.

15. The method of claim 11, wherein the first ambient light parameter comprises at least one of a lux value, a sensor data, a scene analysis data, a face recognition data, and a light intensity.

16. The method of claim 11, wherein setting the second camera comprises at least one of an automatic focus (AF) setting, an automatic white balance (AWB) setting, or an automatic exposure control (AEC) setting.

17. The method of claim 11, further comprising:

causing the first image sensor to enter into low power mode in response to the activation of the second camera; and performing at least one of stopping generating frame from the first image sensor and discarding frames by an image signal processor (ISP) received from the first camera.

[18. The method of claim 11, wherein determining the first ambient light parameter comprises:

identifying a face region of the at least one preview image; and determining a lux value of the identified face region as the first ambient light parameter.]

19. The method of claim 11, wherein the *obtaining the at least one preview frame from the first camera includes the* first image sensor [is configured to output] *outputting* data for pixels, and wherein the *capturing the scene using the second camera includes the* second image sensor [is configured to output] *outputting* binning data by combining pixels based on a pixel binning.

20. The method of claim 11, further comprising:

performing a process of highlighting an object in the captured scene using the second camera.

*21. An electronic device comprising:*

*a first camera;*

*a second camera;*

*memory storing instructions; and*

*at least one processor,*

*wherein the at least one processor is configured to execute the instructions to:*

*enable an image capture application of the electronic device;*

*control to display a first preview image from the first camera, after enabling the image capture application;*

*obtain a lux value based on at least one of a first sensor data from the first camera or a second sensor data from the second camera; and*

*based on the obtained lux value being smaller than a first threshold, switch from displaying the first preview image to displaying a second preview image from the second camera,*

*wherein, the at least one processor is further configured to execute the instructions to:*

*perform a setting of the second camera by adjusting a default value of the setting of the second camera within a time interval, and the time interval including a duration for adjusting at least one of auto focusing (AF) setting, automatic white balancing (AWB) setting, or automatic exposure controlling (AEC) setting,*

*after a stabilization time, display the second preview image, the stabilization time including the time interval,*

*control to no longer display the first preview image after the time interval,*

*control to capture the second preview image using the second camera,*

*wherein the first camera includes a first image sensor of a first sensitivity, and the second camera includes a second image sensor of a second sensitivity, and*

*wherein the second sensitivity is higher than the first sensitivity.*

*22. A method for an electronic device including a first camera and a second camera, the method comprising:*

*enabling an image capture application of the electronic device;*

*displaying a first preview image from the first camera, after enabling the image capture application;*

*obtaining a lux value based on at least one of a first sensor data from the first camera or a second sensor data from the second camera; and*

*based on the obtained lux value being smaller than a first threshold, switching from displaying the first preview image to displaying a second preview image from the second camera, the switching comprising:*

*after a stabilization time, displaying the second preview image, the stabilization time including a time interval, and the time interval including a duration for adjusting at least one of auto focusing (AF) setting, automatic white balancing (AWB) setting, or automatic exposure controlling (AEC) setting,*

*no longer displaying the first preview image after the time interval,*

*capturing the second preview image using the second camera,*

*wherein the first camera includes a first image sensor of a first sensitivity, the first preview image being captured by the first image sensor, and the second camera includes a second image sensor of a second sensitivity, the second preview image being captured by the second image sensor and*

*wherein the second sensitivity is higher than the first sensitivity.*

*23. A non-transitory computer readable medium having recorded thereon instructions executable by at least one processor to cause the at least one processor to perform a method comprising:*

*enabling an image capture application of the electronic device;*

*displaying a first preview image from the first camera, after enabling the image capture application;*

*obtaining a lux value based on at least one of a first sensor data from the first camera or a second sensor data from the second camera; and*

*based on the obtained lux value being smaller than a first threshold, switching from displaying the first preview image to displaying a second preview image from the second camera, the switching including:*

*after a stabilization time, displaying the second preview image, the stabilization time including a time interval, and the time interval including a duration for adjusting at least one of auto focusing (AF) setting, automatic white balancing (AWB) setting, or automatic exposure controlling (AEC) setting,*

*no longer displaying the first preview image after the time interval,*

*capturing the second preview image using the second camera,*

*wherein the first camera includes a first image sensor of a first sensitivity, the first preview image being captured by the first image sensor, and the second camera includes a second image sensor of a second sensitivity, the second preview image being captured by the second image sensor and*

*wherein the second sensitivity is higher than the first sensitivity.*

* * * * *